United States Patent [19]
Ishimaru

[11] Patent Number: 6,104,122
[45] Date of Patent: Aug. 15, 2000

[54] ACTUATOR

[75] Inventor: Toshiaki Ishimaru, Hino, Japan

[73] Assignee: Olympus Optical Co., Ltd., Japan

[21] Appl. No.: 09/164,235

[22] Filed: Sep. 30, 1998

[30]   Foreign Application Priority Data

Sep. 30, 1997  [JP]  Japan .................................. 9-266991

[51] Int. Cl.[7] .............................................. H01L 41/08
[52] U.S. Cl. .............................. 310/323.02; 310/323.16; 310/316.01
[58] Field of Search ...................... 310/323.02, 323.16, 310/323.17, 328, 321, 316.01

[56]   References Cited

U.S. PATENT DOCUMENTS

| | | | |
|---|---|---|---|
| 4,857,791 | 8/1989 | Uchino et al. ................. | 310/323.02 X |
| 5,783,899 | 7/1998 | Okazaki ......................... | 310/323.16 X |
| 5,821,667 | 10/1998 | Takagi et al. .................. | 310/323.01 X |
| 5,831,370 | 11/1998 | Sugaya ............................. | 310/323.01 |
| 5,905,327 | 5/1999 | Ooi et al. ........................ | 310/323.01 X |
| 5,917,268 | 6/1999 | Takagi ............................ | 310/323.02 X |

*Primary Examiner*—Mark O. Budd
*Attorney, Agent, or Firm*—Ostrolenk, Faber, Gerb & Soffen, LLP

[57]   ABSTRACT

This invention is an actuator including a vibration member to which a piezoelectric element is fixed, a plurality of projections arranged at node positions of a tertiary stationary wave on the vibration member, another plurality of projections arranged at node positions of a quintic stationary wave on a vibration member, a rotating member which is in press contact with these projections, and a fixing member for holding the vibration member and pivotally holding the rotating member. A tertiary or quintic stationary wave is selectively excited in the vibration member to rotate the rotating member in one direction or another direction.

39 Claims, 29 Drawing Sheets

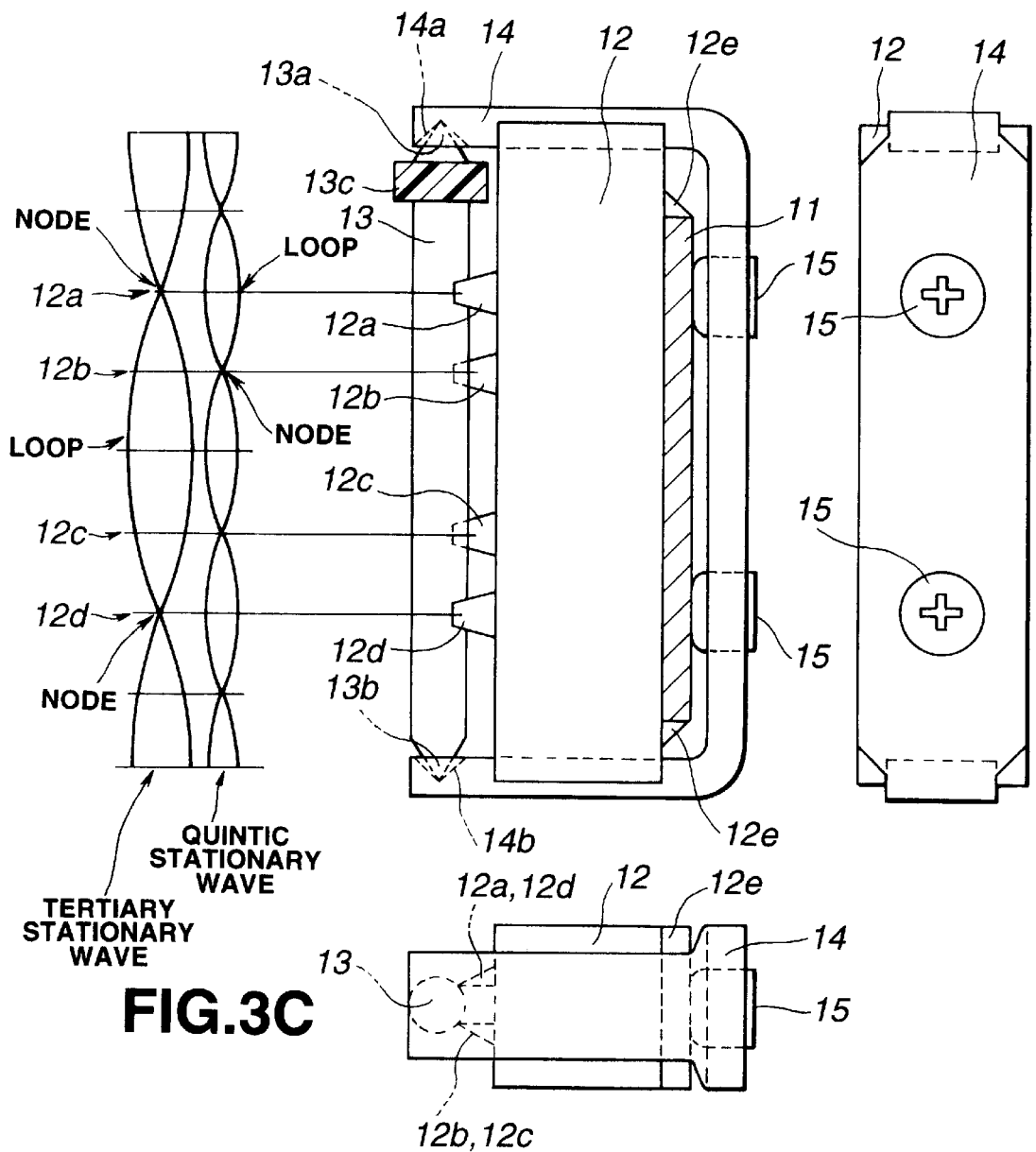

FIG.4A FIG.4B
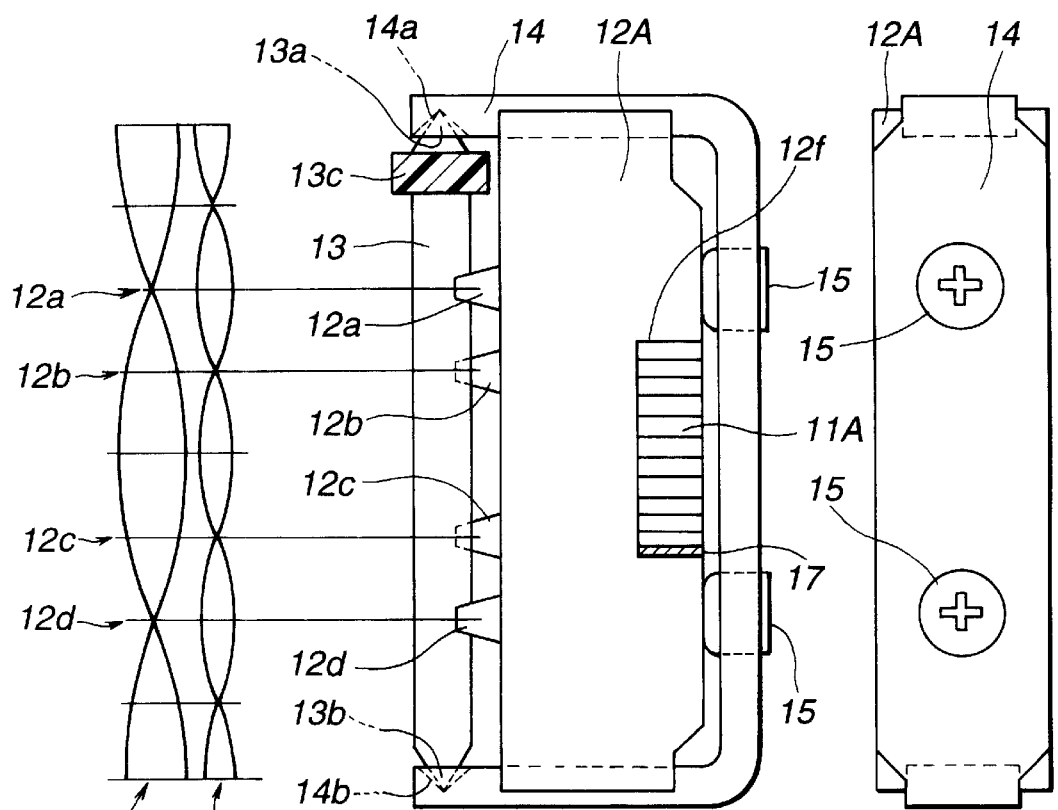
FIG.4C
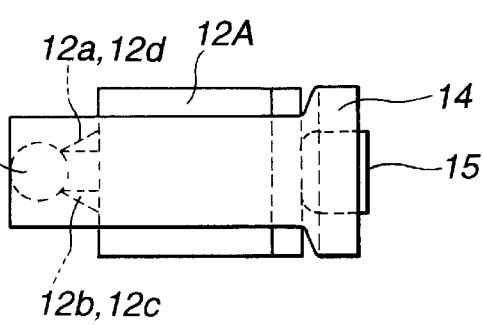

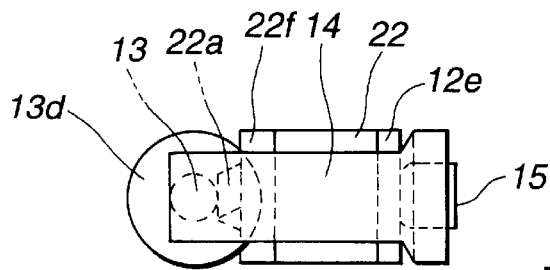
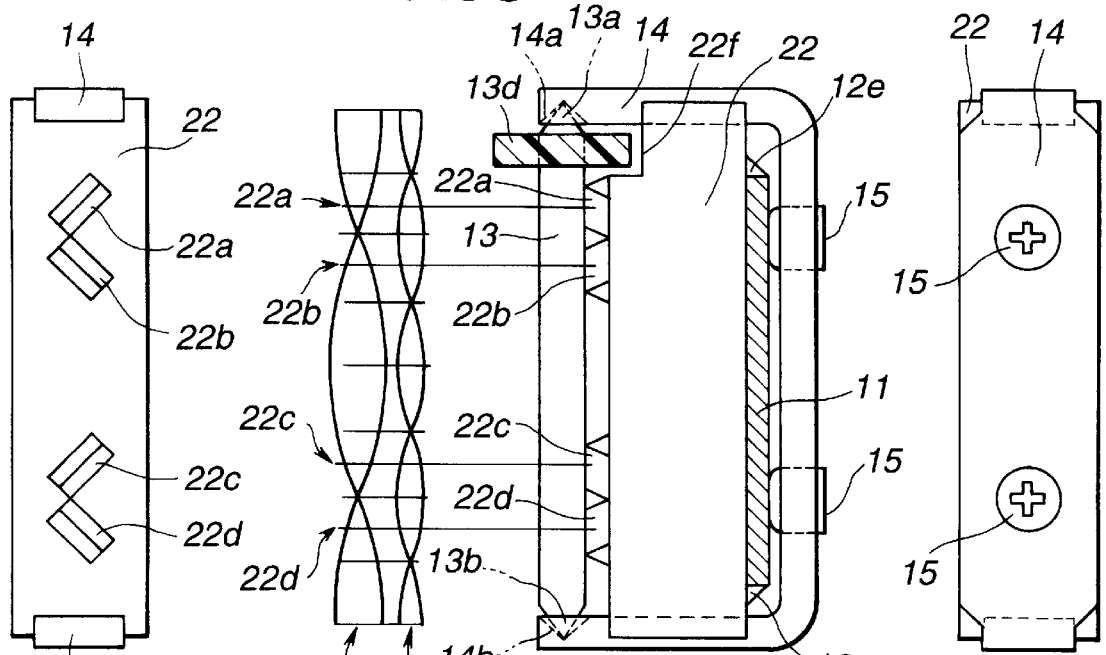
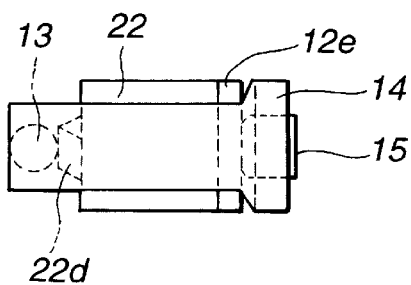

TERTIARY STATIONARY WAVE

QUINTIC STATIONARY WAVE

FIG.13
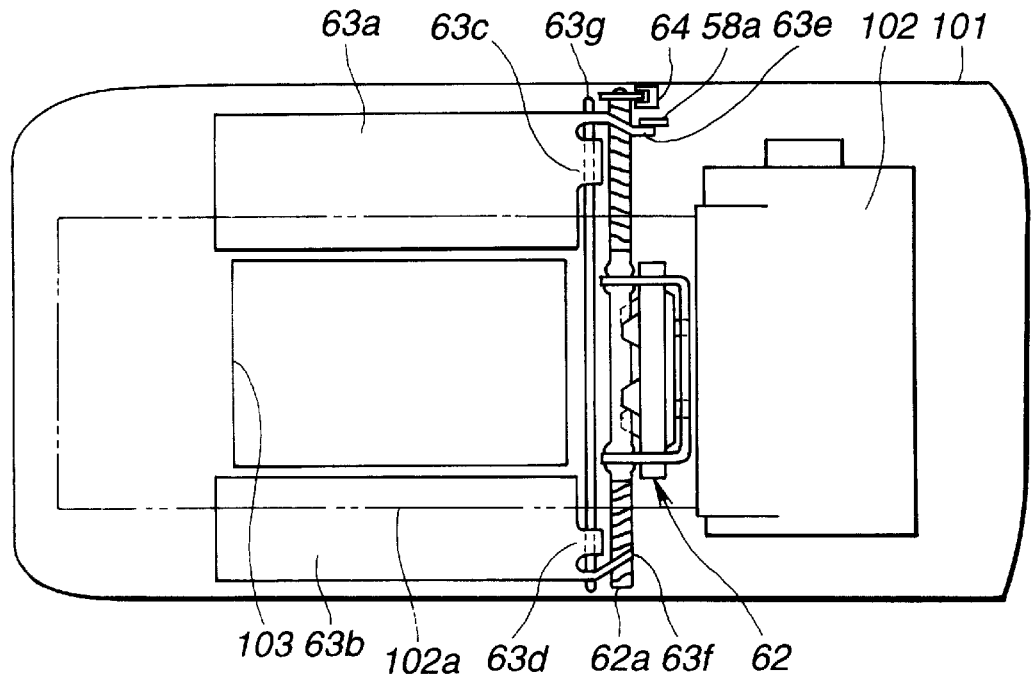
FIG.14A  FIG.14B
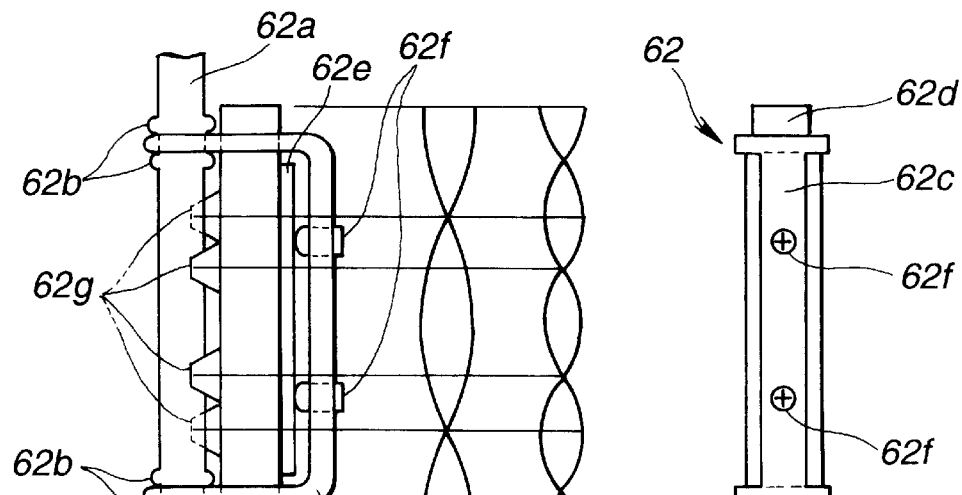
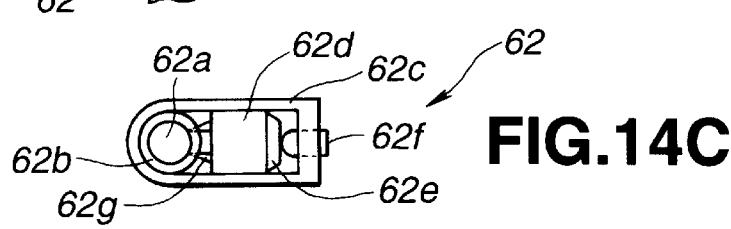
FIG.14C

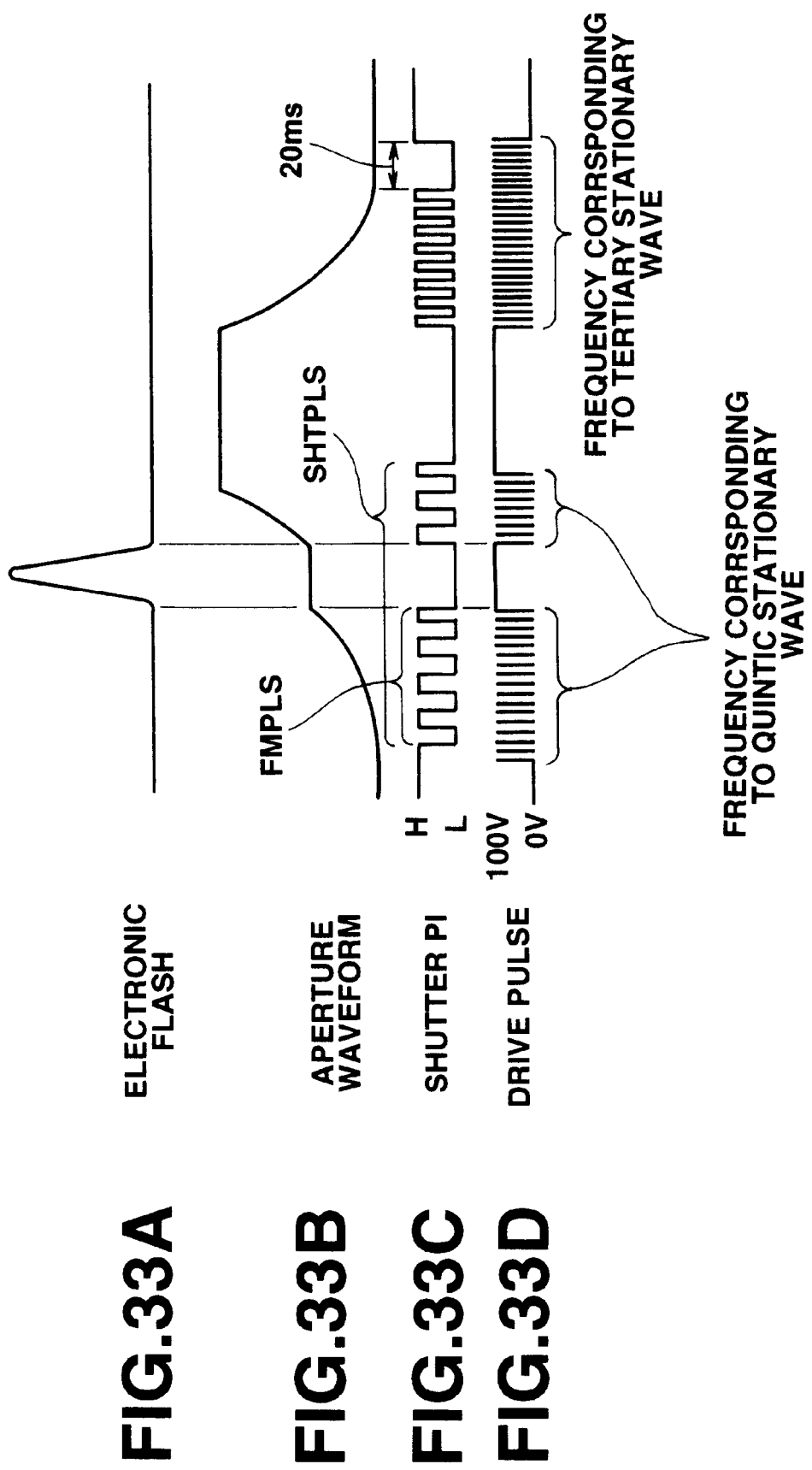

FIG.36
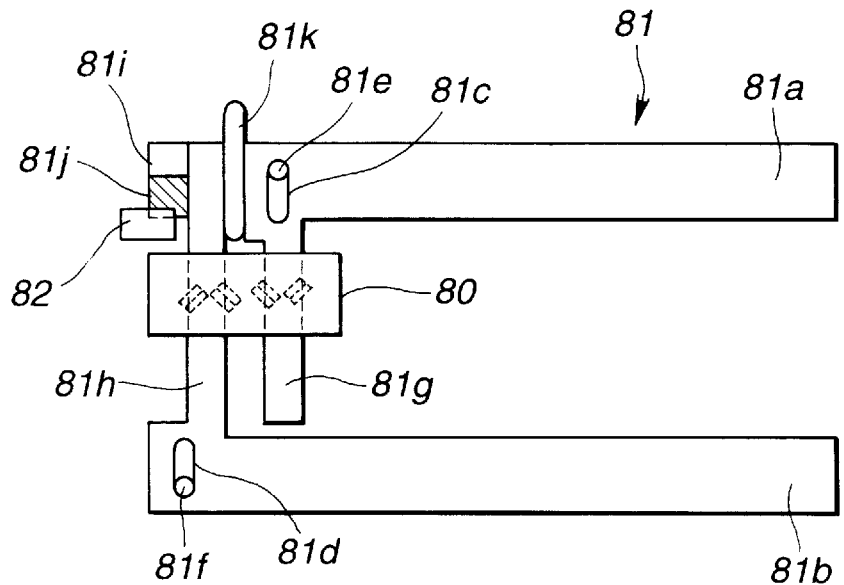
FIG.37A  DRIVE PULSE
FIG.37B  FINDER MASK PI
FIG.37C  DRIVE PULSE
FIG.37D  FINDER MASK PI

FIG.38A FIG.38B
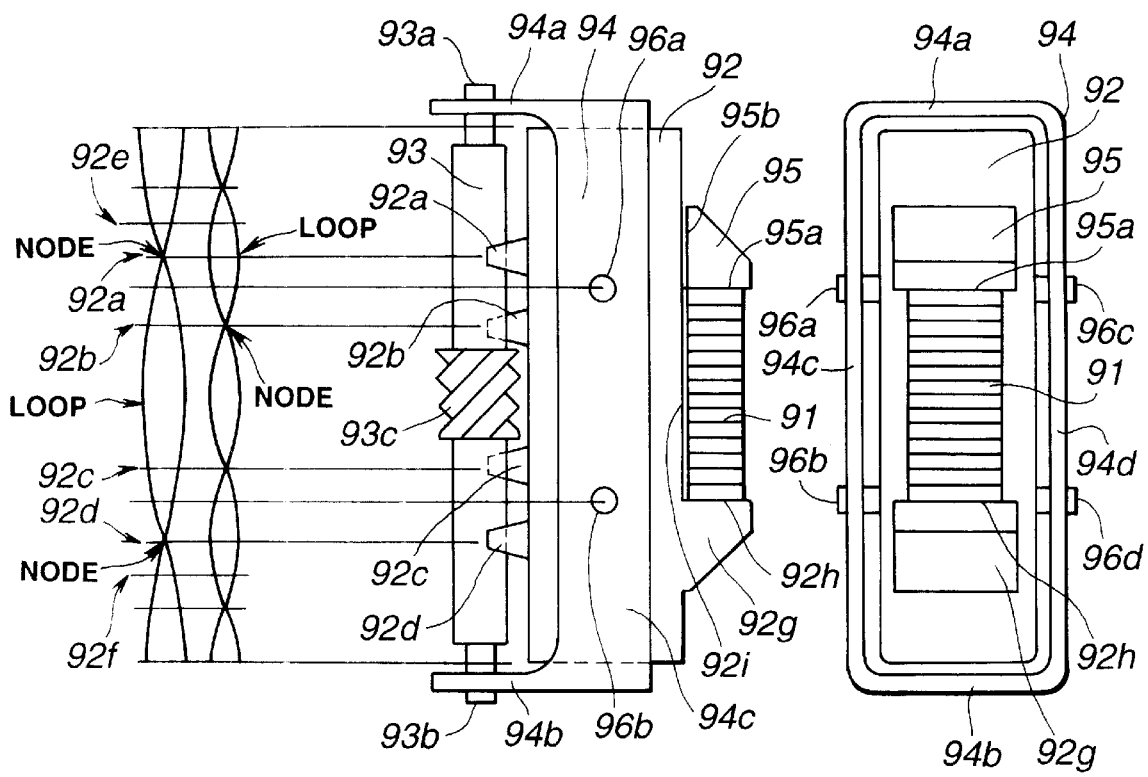
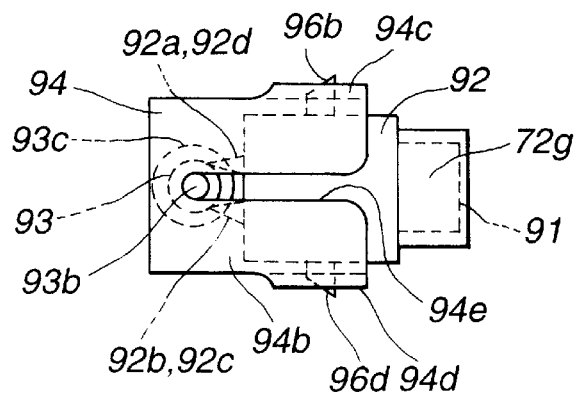
FIG.38C

ACTUATOR

BACKGROUND OF THE INVENTION

1. Field of the Invention

The present invention relates to an actuator and, more particularly, to an actuator using an electromechanical energy conversion element.

2. Description of the Related Art

Various actuators which use electromechanical energy conversion elements as piezoelectric elements are proposed. For example, the present applicant has developed an actuator which is driven in two directions using one piezoelectric element. The contents of this invention were filed in Japanese Patent Application No. 9-11424 in Japanese Patent Office.

The piezoelectric actuator, described in Japanese Patent Application No. 9-11424, in which a vibrator is vibrated by applying a pulse voltage to one piezoelectric element to make it possible to move a movable member which is in press contact with the vibrator, comprises: a pulse control circuit for selectively making it possible to apply a first pulse voltage to the piezoelectric element to cause the vibrator to generate a vibration having a first resonance frequency, or apply a second pulse voltage to the piezoelectric element to cause the vibrator to generate a vibration having a second resonance frequency, and a drive transmission means for transmitting the generated vibration to the movable means such that the movable means is driven in a first direction when the vibration having the first resonance frequency is generated, and the movable means is driven in a second direction when the vibration having the second resonance frequency is generated.

In the actuator described in Japanese Patent Application No. 9-11424, an embodiment is proposed in which there is a means for holding a vibrator and a member to be driven, and a means for pressing the vibrator and the member to be driven. However, these proposed elements are not described. It is difficult to actually design the actuator of that embodiment.

SUMMARY OF THE INVENTION

It is an object of the present invention to provide an actuator which is capable of holding a vibrator and a member to be driven and which is a simple arrangement.

In brief, according to the present invention, there is provided an actuator comprising: an electromechanical energy conversion element, a vibrator to which the electromechanical energy conversion element is fixed and which excites a vibration by applying a drive voltage to the electromechanical energy conversion element, a member to be driven which is in press contact with the vibrator and moved by the vibration excited by the vibrator with respect to the vibrator, and a fixing member for holding the vibrator and the member to be driven, and regulating a moving direction of the member to be driven with respect to the vibrator.

These objects and advantages of the present invention will become apparent from the following detailed explanation.

BRIEF DESCRIPTION OF THE DRAWINGS

FIG. 3A is a front view showing the arrangement of an actuator according to the first embodiment of the present invention.

FIG. 3B is a right-side view showing the arrangement of the actuator according to the first embodiment of the present invention.

FIG. 3C is a bottom view showing the arrangement of the actuator according to the first embodiment of the present invention.

FIG. 4A is a front view showing the arrangement of an actuator of a modification of the first embodiment.

FIG. 4B is a right-side view showing the arrangement of the actuator of the modification of the first embodiment.

FIG. 4C is a bottom view showing the arrangement of the actuator of the modification of the first embodiment.

FIG. 5A is a plan view showing the arrangement of an actuator according to the second embodiment of the present invention.

FIG. 5B is a left-side view showing the arrangement of the actuator according to this embodiment in a state wherein a rotating member is removed.

FIG. 5C is a front view showing the arrangement of the actuator according to the second embodiment.

FIG. 5D is a right-side view showing the arrangement of the actuator according to the second embodiment.

FIG. 5E is a bottom view showing the arrangement of the actuator according to the second embodiment.

FIG. 13 is a view showing the arrangement of a film mask of the camera according to the fifth embodiment.

FIG. 14A is a front view showing the arrangement of a film mask motor according to the fifth embodiment.

FIG. 14B is a right-side view showing the arrangement of the film mask motor according to the fifth embodiment.

FIG. 14C is a front view showing the arrangement of the film mask motor according to the fifth embodiment.

FIGS. 33A, 33B, 33C, and 33D are graphs showing aperture waveforms of the shutter unit of a camera according to the fifth embodiment.

FIG. 36 is a front view showing the arrangement of a finder mask unit of the camera according to the fifth embodiment.

FIGS. 37A and 37B are waveform charts showing control signals when the finder mask unit is set in a panorama state in the camera according to the fifth embodiment.

FIGS. 37C and 37D are waveform charts showing control signals when the finder mask unit is set in a normal state in the camera according to the fifth embodiment.

FIG. 38A is a front view showing the arrangement of an actuator according to the sixth embodiment of the present invention.

FIG. 38B is a right-side view showing the arrangement of the actuator according to the sixth embodiment of the present invention.

FIG. 38C is a bottom view showing the arrangement of the actuator according to the sixth embodiment of the present invention.

DESCRIPTION OF THE PREFERRED EMBODIMENTS

Embodiments of the present invention will be described below with reference to the accompanying drawings.

Figure 1:
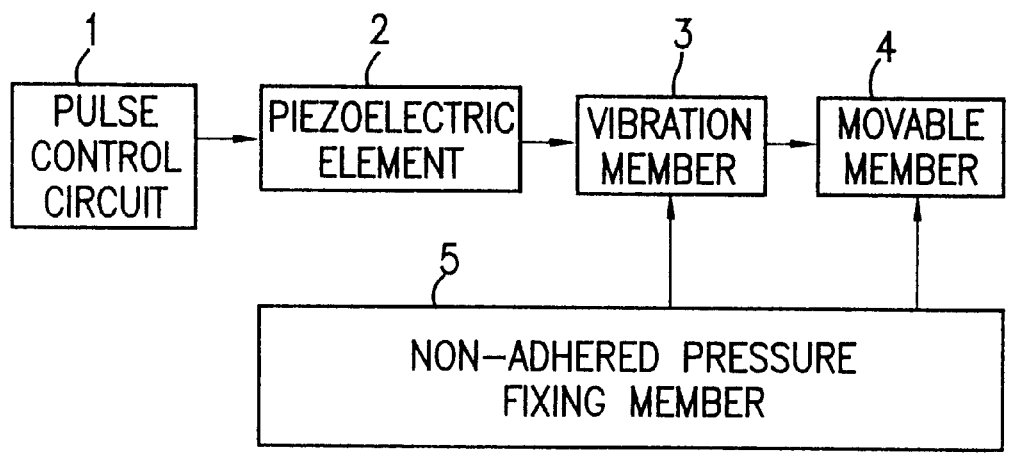
FIG. 1 is a block diagram showing the first basic arrangement of an actuator according to an embodiment of the present invention.

FIG. 1 is a block diagram showing a first basic arrangement of an actuator according to the present invention.

This actuator is comprised of a pulse control circuit 1 serving as a pulse generation means for outputting a pulse voltage, a piezoelectric element 2 serving as an electromechanical energy conversion element for performing an extending/contracting operation by applying an output from the pulse control circuit 1, a vibration member 3 serving as a vibrator for generating a vibration by extending/contracting the piezoelectric element 2, a movable member 4 which is in press contact with the vibration member 3 and serves as a movable member to be driven, and a fixing member 5 for regulating movement of the movable member 4 in directions except for a movable direction and for pressing the vibration member 3 and the movable member 4 to generate frictional force to prevent the vibration member 3 and the movable member 4 from being slid in the movable direction.

Figure 2:
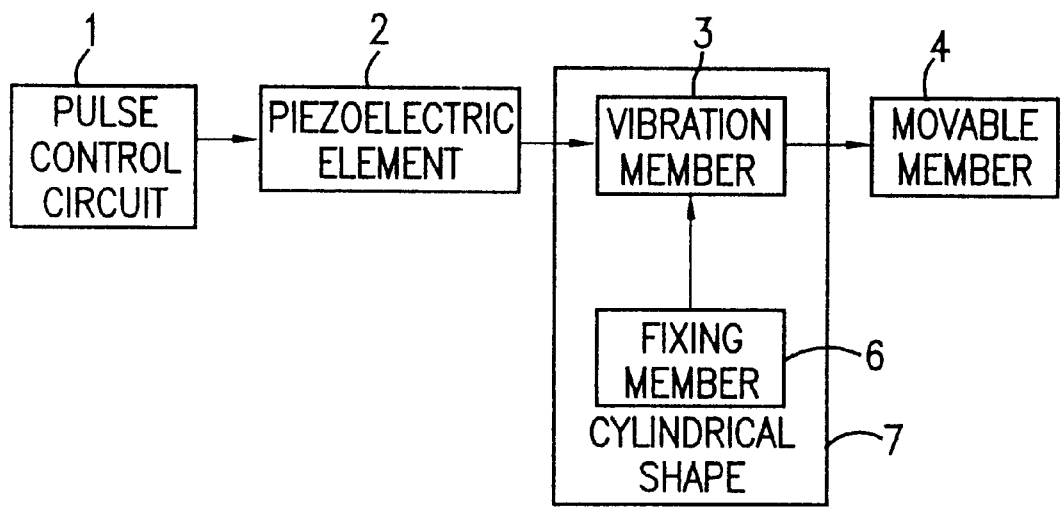
FIG. 2 is a block diagram showing the second basic arrangement of an actuator according to an embodiment of the present invention.

FIG. 2 is a block diagram showing a second basic arrangement of an actuator according to the embodiment of the present invention.

This actuator is comprised of a pulse control circuit 1 serving as a pulse generation means for outputting a pulse voltage, a piezoelectric element 2 for performing an extending/contracting operation by applying an output from the pulse control circuit 1, a vibration member 3 for generating a vibration by extending/contracting the piezoelectric element 2, a fixing member 6 which is fixed to the vibration member 3 to constitute a cylindrical shape 7, and a movable member 4 which regulates movement in directions other than the penetrating direction by penetrating the movable member 4 through the inside of the cylindrical shape 7 so that the movable member 4 can be moved in only the penetrating direction. The moveable member 4 is fixed to be prevented from being slid in the penetrating direction by friction between the vibration member 3 and the fixing member 6.

The main operation of the arrangements shown in FIG. 1 or FIG. 2 is as follows.

The vibration member 3 has at least two resonance frequencies. When a pulse voltage which generates the first resonance frequency of the two resonance frequencies is applied from the pulse control circuit 1 to the piezoelectric element 2, a vibration having the first resonance frequency is generated by the vibration member 3. With the vibration, force in the first direction is generated at a position where the vibration member 3 is in press contact with the movable member 4, and the movable member 4 moves in the first direction.

On the other hand, when a vibration having the second resonance frequency is generated by the vibration member 3, force in the second direction is generated at a position where the vibration member 3 is in press contact with the movable member 4, and the movable member 4 moves in the second direction.

In this manner, the resonance frequency of the pulse voltage applied from the pulse control circuit 1 to the piezoelectric element 2 is changed to cause the vibration member 3 to generate different vibrations, so that the movable member 4 can be driven in two directions.

A more detailed embodiment will be described below.

FIGS. 3A, 3B, and 3C show the first embodiment of the present invention, and are front, right-side, and bottom views, respectively showing the arrangement of an actuator.

This actuator is constituted such that a vibration member 12 serving as a vibrator to which a piezoelectric element 11, serving as an electromechanical energy conversion element is adhered is brought into contact with a rotating member 13 serving as a member to be driven by using a fixing member 14.

More specifically, a plurality of positioning projections 12e extend from one surface of the vibration member 12 having an almost rectangular parallelopiped shape, and the piezoelectric element 11 subjected to a polarization process and having an almost plate-like shape is adhered to be interposed by the positioning projections 12e.

As shown in FIG. 3A, four projections 12a, 12b, 12c, and 12d sequentially vertically extend from the surface of the vibration member 12 opposing the surface to which the piezoelectric element 11 is adhered. Of these projections, projections 12a and 12d are arranged on this side, and projections 12b and 12c are arranged on the other side.

The vibration member 12 is held such that it is interposed by the fixing member 14 having an almost U shape. A pair of conical recessed portions 14a and 14b are formed in the fixing member 14. Sharp ends 13a and 13b formed at both ends of the rotating member 13 are supported at points by the recessed portions 14a and 14b to pivotally hold the rotating member 13.

For example, a helical gear 13c is pivotally integrated with one end of the rotating member 13, so that generated drive force can be transmitted to another member.

A pair of screws 15 are penetrated through the fixing member 14 to be meshed with the fixing member 14, and the penetrating end is brought into contact with the piezoelectric element 11. By adjusting the amounts of meshing of the screws 15, the pressing force acting when the four projections 12a, 12b, 12c, and 12d of the vibration member 12 are brought into contact with the peripheral surface of the rotating member 13 can be adjusted to an appropriate force. An appropriate pressing force would remove any unexpected sliding of the rotating member 13 since the sliding can be regulated by frictional force when no vibration is generated by the vibration member 12. When a vibration is generated by the vibration member 12, the pressing force can be adjusted to a pressing force which can rotate the rotating member 13 at the highest efficiency.

An operation of the actuator according to the first embodiment will be described below.

When a pulse voltage from the pulse control circuit 1 (see FIGS. 1 and 2) is applied to the piezoelectric element 11, the piezoelectric element 11 performs an extending/contracting operation to cause the vibration member 12 to generate a vibration. At this time, when the frequency of the pulse voltage is appropriately selected, the vibration generated by the vibration member 12 becomes a stationary wave.

As shown in FIG. 3A, the projections 12a and 12d are located at nodes when a tertiary stationary wave is generated by the vibration member 12, and are located at loops when a quintic stationary wave is generated by the vibration member 12. The projections 12b and 12c are located at loops (portions except for nodes) when a tertiary stationary wave is generated by the vibration member 12, and are located at nodes when a quintic stationary wave is generated by the vibration member 12.

Therefore, when a pulse drive operation is performed by a frequency at which the tertiary stationary wave is generated, the projections 12b and 12c press the rotating member 13, but no pressing force is generated by the projections 12a and 12d because the projections 12a and 12d are located at nodes. In this manner, when viewed from the bottom surface side as shown in FIG. 3C, the rotating member 13 is clockwise rotated.

Similarly, when a pulse drive operation is performed by a frequency at which the quintic stationary wave is generated, the projections 12a and 12d press the rotating member 13, but no pressing force is generated by the projections 12b and 12c because the projections 12b and 12c are located at loops. In this manner, when viewed from the bottom surface side as shown in FIG. 3C, the rotating member 13 is counterclockwise rotated.

As described above, according to the first embodiment, although only one piezoelectric element is used, when a frequency at which a stationary wave is generated is changed, the rotating member can be rotated in either of the forward and backward directions. Since a member for fixing the rotating shaft of the rotating member and a member for positioning, holding, and pressing the vibration member are made of one member, the actuator can be reduced in size.

A circuit for applying a high-voltage drive pulse to the piezoelectric element to vibrate the vibration member by a tertiary or quintic stationary wave, as described in, e.g., the above related art, an art described in Japanese Patent Application No. 9-11424 or the like, can be applied to the present invention.

In the above description, a piezoelectric element is used as an electromechanical energy conversion element. PZT (lead zirconate titanate), barium titanate, or the like can be properly used as the piezoelectric element.

In addition, the electromechanical energy conversion element is not limited to the piezoelectric element, and an electrostrictive element or a magnetostrictive element can also be used. For example, magnetic force may also be applied as a pulse by using the magnetostrictive element (especially, a super-magnetostrictive element) to vibrate the vibration member by a tertiary or quintic stationary wave.

In the above embodiment, a plate-like piezoelectric element subjected to a polarization process is used. However, a laminate type piezoelectric element, a laminate type electromotive element, or a laminate type magnetostrictive element may be used as a matter of course. A bymorph element or a monomorph element may also be used.

In addition, the mode of a vibration excited by the vibration member is changed (between a tertiary mode and a quintic mode) by selectively changing the frequency of a drive signal applied to the piezoelectric element. However, the mode of vibration excited by the vibration member may be changed by the following method. That is, a plurality of piezoelectric elements having different polarization directions are fixed to the vibration member, and a piezoelectric element to which a drive signal is applied is selected from the plurality of piezoelectric elements.

Although the case wherein the vibration mode is changed between a tertiary mode and a quintic mode is described above, the vibration mode may be changed between, e.g., tertiary and septinary or between quintic and septinary, and the vibration mode to be changed is not limited. A projection is located at a position which becomes a node when a certain frequency is set and becomes a portion except for a node when another frequency is set, and a projection is located at a position which becomes a portion except for a node when the certain frequency is set and becomes a node when the other frequency is set. With this arrangement, it is satisfactory that a moving member can be pressed to the projections to be fixed.

The shapes of contact portions between the projections 12a, 12b, 12c, and 12d and the rotating member 13 may be arranged parallel to the rotating shaft, may be formed as inclined shapes or may be formed such that the projections 12a, 12b, 12c, and 12d are in point contact with the rotating member 13. Material may be selected from aluminum whose surface is subjected to an oxide film process, various metals, and various materials such as various composite resins in consideration of necessary strength or frictional force.

FIGS. 4A, 4B, and 4C show a modification of the first embodiment, and a front surface, a right-side surface, and a bottom surface, respectively showing the arrangement of an actuator, respectively. The same reference numerals as in the first embodiment denote the same parts in this modification, and a description thereof will be omitted. Only differences between the first embodiment and the modification will be described below.

This modification uses a laminate type piezoelectric element as an electromechanical energy conversion element.

A rectangular notch 12f is formed in a vibration member 12A, a laminate type piezoelectric element 11A is fitted in the notch 12f to be fixed to the notch 12f with an adhesive 17.

As this adhesive 17, an adhesive such as an epoxy-resin-based adhesive or a two-component acrylic adhesive which has high adhesive strength and high durability, and high hardness as a most important point is used. This is because a vibration generated by the piezoelectric element 11A is not absorbed by the adhesive, i.e., it is desirable that the vibration is almost directly transmitted to the vibration member such that energy loss is made as small as possible.

The other portions in the embodiment are the same as those of the arrangement shown in FIGS. 3A, 3B, and 3C.

The operation of the above modification will be described below.

When a drive signal is applied to the laminate type piezoelectric element 11A, as in the first embodiment described above, a vibration of a stationary wave in a tertiary (or quintic) vibration mode is excited by the vibration member 12A, and the vibration is transmitted to a rotating member 13 through projections 12a, 12b, 12c, and 12d to rotate the rotating member 13. When the vibration mode is changed, the rotating direction can be selected.

With this modification, an effect which is almost the same as that of the first embodiment can be obtained by using a laminate type piezoelectric element.

FIGS. 5A, 5B, 5C, 5D, and 5E show the second embodiment of the present invention, and are a plan view showing the arrangement of an actuator, a left-side view, a front-side view, a right-side view, and a bottom view, respectively showing a state wherein a rotating member is removed.

The same reference numerals as in the first embodiment denote the same parts in the second embodiment, and a description thereof will be omitted. Only the differences between the first embodiment and the second embodiment will be described below.

This actuator is arranged such that a vibration member 22 adhered to a piezoelectric element 11 is brought into press contact with a rotating member 13 by using a fixing member 14.

On the surface of the vibration member 22 opposing the surface to which the piezoelectric element 11 is adhered, as shown in FIGS. 5B and 5C, four projections 22a, 22b, 22c, and 22d each having an almost triangular shape are sequentially vertically extend at angles of about 45° with respect to the rotating shaft of the rotating member 13.

In addition, of these projections, the projections 22a and 22d are arranged almost perpendicular to each other at right angles to form a V shape, and the projections 22b and 22c are also arranged almost perpendicular to each other at right angles to form a V shape. The inclination directions of the projection 22a and the projection 22c are almost parallel to each other, and the projections 22b and 22d are also arranged almost parallel to each other.

In the vibration member 22, a relief portion 22f is formed for a helical gear 13d fixed to one end of the rotating member 13.

The operation of the actuator according to the second embodiment will be described below.

When a pulse voltage from the pulse control circuit 1 (see FIGS. 1 and 2) is applied to the piezoelectric element 11, the piezoelectric element 11 performs an extending/contracting operation to cause the vibration member 22 to generate a vibration. At this time, when the frequency of the pulse voltage is appropriately selected, the vibration generated by the vibration member 22 becomes a stationary wave.

As shown in FIG. 5C, the projections 22a and 22b are arranged at positions where the extension of an amplitude obtained when a tertiary stationary wave is generated by the vibration member 22 is different from the extension of an amplitude obtained when a quintic stationary wave is generated by the vibration member 22. The projections 22a and 22b are inclined in directions which are opposite to each other. The projections 22c and 22b are also arranged at positions where the extension of an amplitude obtained when a tertiary stationary wave is generated by the vibration member 22 is different from the extension of an amplitude obtained when a quintic stationary wave is generated by the vibration member 22. The projections 22c and 22b are inclined in directions which are opposite to each other.

When a pulse drive operation is performed by a frequency at which a tertiary stationary wave is generated, the projections 22a and 22b apply force in a direction in which the width of the V shape is reduced to the rotating member 13. The projections 22c and 22d also apply force in a direction in which the width of the V shape is reduced to the rotating member 13. In this manner, the rotating member 13 is clockwise rotated when viewed from the upper side as shown in FIG. 5A.

Similarly, when a pulse drive operation is performed by a frequency at which a quintic stationary wave is generated, the projections 22a and 22b apply force in a direction in which the width of the V shape is increased to the rotating member 13. The projections 22c and 22d also apply force in a direction in which the width of the V shape is increased to the rotating member 13. In this manner, the rotating member 13 is counterclockwise rotated when viewed from the upper side as shown in FIG. 5A.

According to the second embodiment, by using the projections arranged in V shapes, an effect which is almost the same as that of the first embodiment can be obtained.

The change is not limited to the change in vibration mode between the tertiary mode and the quintic mode. As in the above embodiment, the projections may be arranged at positions where the manner of an amplitude at a certain frequency is different from the manner of an amplitude at another frequency and inclined with respect to the amplitudes, so that the moving member can be pressed to and fixed to the projections.

Figure 6:
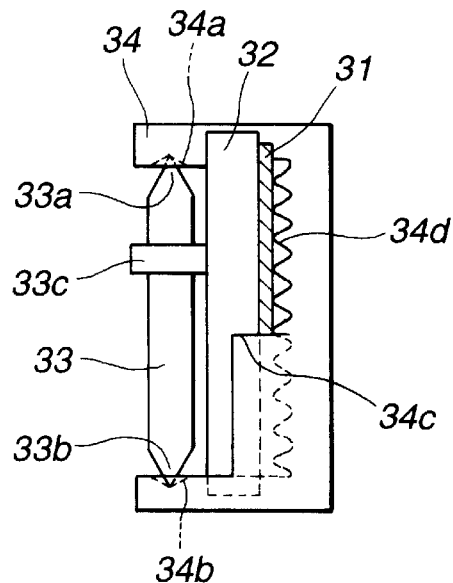
FIG. 6 is a front view showing the arrangement of an actuator according to the third embodiment of the present invention.
Figure 7:
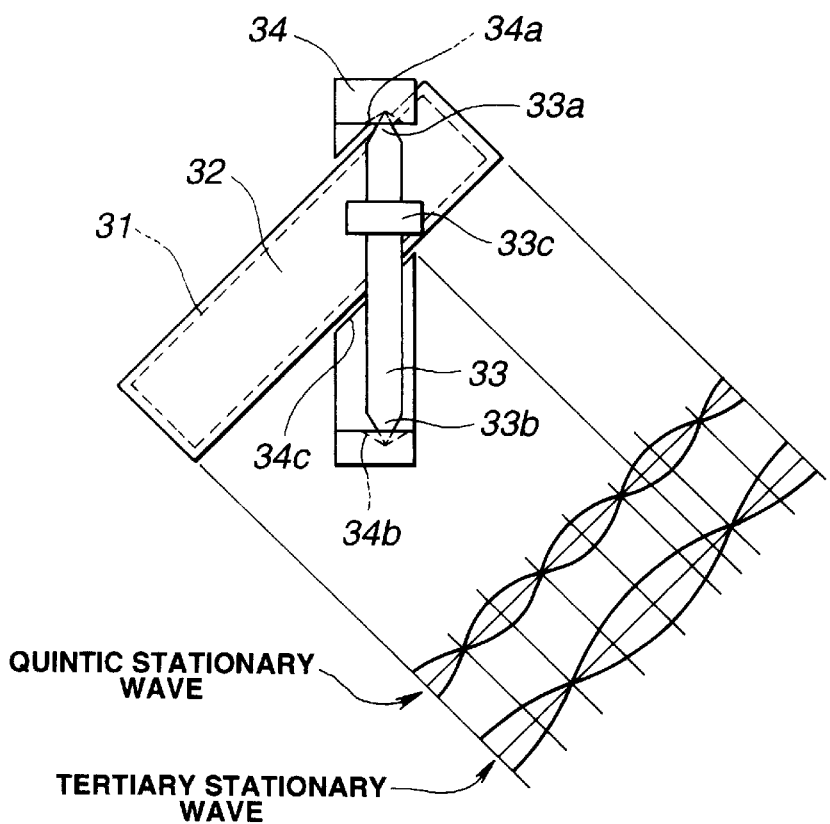
FIG. 7 is a left-side view showing the arrangement of the actuator according to the third embodiment.

FIGS. 6 and 7 show the third embodiment of the present invention, in which FIG. 6 is a front view showing the arrangement of an actuator, and FIG. 7 is a left-side view showing the arrangement of the actuator. The same reference numerals as in the first and second embodiments denote the same parts in the third embodiment, and a description thereof will be omitted. Only the different between the third embodiment and the first and second embodiments will be described below.

This actuator is arranged such that a vibration member 32 adhered to a piezoelectric element 31 is brought into press contact with a rotating member 33 by using a fixing member 34.

More specifically, the almost plate-like piezoelectric element 31 subjected to a polarizing process is adhered to one surface of the vibration member 32 having an almost rectangular parallelopiped shape.

The vibration member 32 is held to be inclined at about 45° with respect to the fixing member 34 having an almost U shape, as shown in FIG. 7. More specifically, a inclined recessed portion 34c and a rolling projection 34d are arranged in the fixing member 34, the inclination angle of the vibration member 32 is regulated by the inclined recessed portion 34c, and the rolling projection 34d is in contact with the piezoelectric element 31.

In addition, a pair of conical recessed portions 34a and 34b are formed in the fixing member 34, and sharp ends 33a and 33b formed at both the ends of the rotating member 33 are supported at points by the recessed portions 34a and 34b to be interposed between the recessed portions 34a and 34b, so that the rotating member 33 is pivotally held.

A large-diameter portion 33c is pivotally integrated with the rotating member 33, so that pressing force brings the large-diameter portion 33c into press contact with the surface of the vibration member 32 opposing the surface to which the vibration member 32 is adhered. The pressing force used at this time can regulate unexpected sliding of the rotating member 33 by frictional force when no vibration is generated by the vibration member 32. When a vibration is generated by the vibration member 32, the pressing force can rotate the rotating member 33 at the highest efficiency.

The operation of the actuator according to the third embodiment will be described below.

When a pulse voltage from the pulse control circuit 1 (see FIGS. 1 and 2) is applied to the piezoelectric element 31, the piezoelectric element 31 performs an extending/contracting operation to cause the vibration member 32 to generate a vibration. At this time, when the frequency of the pulse voltage is appropriately selected, the vibration generated by the vibration member 32 becomes a stationary wave.

As shown in FIG. 7, the large-diameter portion 33c is in contact with positions of the vibration member 32 where the extension of an amplitude obtained when a tertiary stationary wave is generated by the vibration member 32 is different from the extension of an amplitude obtained when a quintic stationary wave is generated by the vibration member 32.

When a pulse drive operation is performed by a frequency at which a tertiary stationary wave is generated, the vibration member 32 presses the large-diameter portion 33c of the rotating member 33 to rotate the rotating member 33 in a clockwise direction when viewed from the upper side.

Similarly, when a pulse drive operation is performed by a frequency at which a quintic stationary wave is generated, the vibration member 32 presses the large-diameter portion 33c of the rotating member 33 to rotate the rotating member 33 in a counterclockwise direction when viewed from the upper side.

According to the third embodiment, when the vibration member is arranged to be inclined with respect to the rotating shaft of the rotating member, an effect which is almost the same as that of each of the embodiments described above can be obtained.

The change is not limited to the change in vibration mode between the tertiary mode and the quintic mode. As in the above embodiment, the rotating member may be arranged at positions where the manner of an amplitude at a certain frequency is different from the manner of an amplitude at another frequency to be inclined with respect to the amplitudes, so that the vibration member can be pressed to and fixed to the large-diameter portion of the rotating member.

Figure 8:
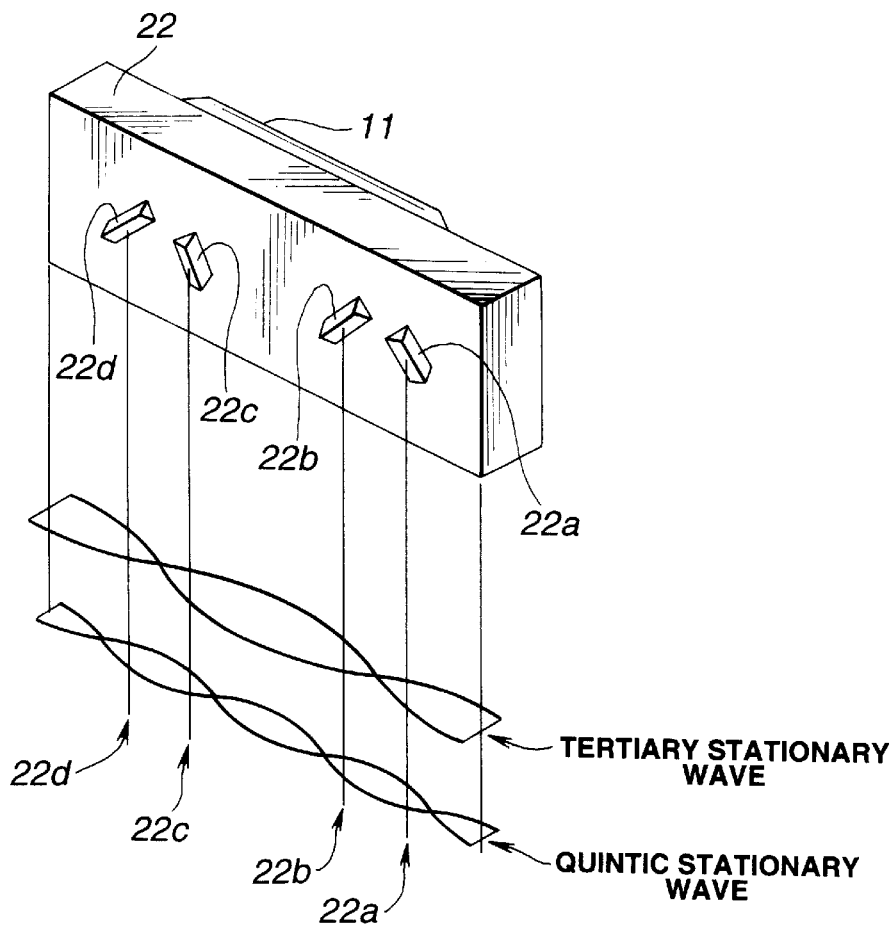
FIG. 8 is a perspective view showing a vibration member and a piezoelectric element which constitute an actuator according to the fourth embodiment of the present invention.
Figure 9:
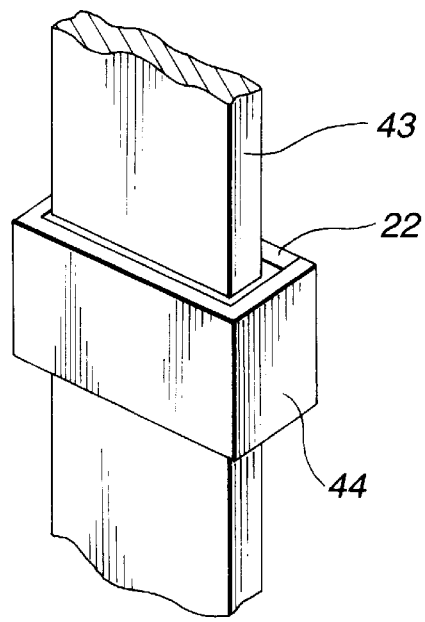
FIG. 9 is a perspective view showing the arrangement of the actuator according to the fourth embodiment.

FIGS. 8 and 9 show the fourth embodiment of the present invention, in which FIG. 8 is a perspective view showing a vibration member and a piezoelectric element which comprise an actuator, and FIG. 9 is a perspective view showing the arrangement of the actuator. The same reference numerals as in the first to third embodiments denote the same parts in the fourth embodiment, and a description thereof will be omitted. Only the differences between the fourth embodiment and the first to third embodiments will be described below.

The fourth embodiment is obtained by applying the arrangement of the second embodiment described above. The fourth embodiment is different from the second embodiment in that a movable member is driven in a linear direction.

A vibration member 22 and a piezoelectric element 11 which constitute the actuator are almost the same as those in the second embodiment as shown in FIG. 8.

The vibration member 22 and a fixing member 44 having an almost U shape are combined and adhered to each other to constitute an almost rectangular cylinder.

A thin plate-like movable member 43 passes through the inside of the rectangular cylinder to regulate movement of the movable member 43 in one plane direction, so that the movable member 43 can be moved in only vertical directions in FIG. 9.

The movable member 43 is arranged to have one surface which is in contact with four projections 22a, 22b, 22c, and 22d formed on the vibration member 22 with pressing force. The pressing force used at this time can regulate unexpected sliding of the movable member 43 by frictional force when no vibration is generated by the vibration member 22. When a vibration is generated by the vibration member 22, the pressing force can rotate the movable member 43 at a highest efficiency.

An operation of the actuator according to the fourth embodiment will be described below.

When a pulse voltage from the pulse control circuit 1 (see FIGS. 1 and 2) is applied to the piezoelectric element 11, the piezoelectric element 11 performs an extending/contracting operation to cause the vibration member 12 to generate a vibration. At this time, when the frequency of the pulse voltage is appropriately selected, the vibration generated by the vibration member 12 becomes a stationary wave.

As shown in FIG. 8, the projections 22a and 22d are arranged at positions where the extension of an amplitude obtained when a tertiary stationary wave is generated by the vibration member 22 is different from the extension of an amplitude obtained when a quintic stationary wave is generated by the vibration member 22. The projections 22a and 22b are inclined in directions which are opposite to each other. The projections 22c and 22b are also arranged at positions where the extension of an amplitude obtained when a tertiary stationary wave is generated by the vibration member 22 is different from the extension of an amplitude obtained when a quintic stationary wave is generated by the vibration member 22. The projections 22c and 22b are inclined in directions which are opposite to each other.

When a pulse drive operation is performed by a frequency at which a tertiary stationary wave is generated, the projections 22a and 22b apply force in a direction in which the width of the V shape is reduced to the movable member 43. The projections 22c and 22d also apply force in a direction in which the width of the V shape is reduced to the movable member 43. In this manner, the movable member 43 is driven downward in FIG. 9.

Similarly, when a pulse drive operation is performed by a frequency at which a quintic stationary wave is generated, the projections 22a and 22b apply force in a direction in which the width of the V shape is increased to the movable member 43. The projections 22c and 22d also apply force in a direction in which the width of the V shape is increased to the movable member 43. In this manner, the movable member 43 is driven upward in FIG. 9.

According to the fourth embodiment described above, an effect which is almost the same as that in each of the above embodiments can be obtained, and the movable member can be moved in a linear direction.

FIGS. 10 to 37D show the fifth embodiment of the present invention. The same reference numerals as in first to fourth embodiments denote the same parts in the fifth embodiment, and a description thereof will be omitted. Only the different points between the fifth embodiment and the first to fourth embodiments will be mainly described below.

The fifth embodiment is obtained by applying the actuators described in the above embodiments to a camera. Here, the fifth embodiment will be described below with reference to an auto-focus (AF) mechanism of a TTL method (method for performing a distance-measurement operation by light passing through a photographing lens) and a zoom lens shutter camera in which a pop-up electronic flash is built.

Figure 10:
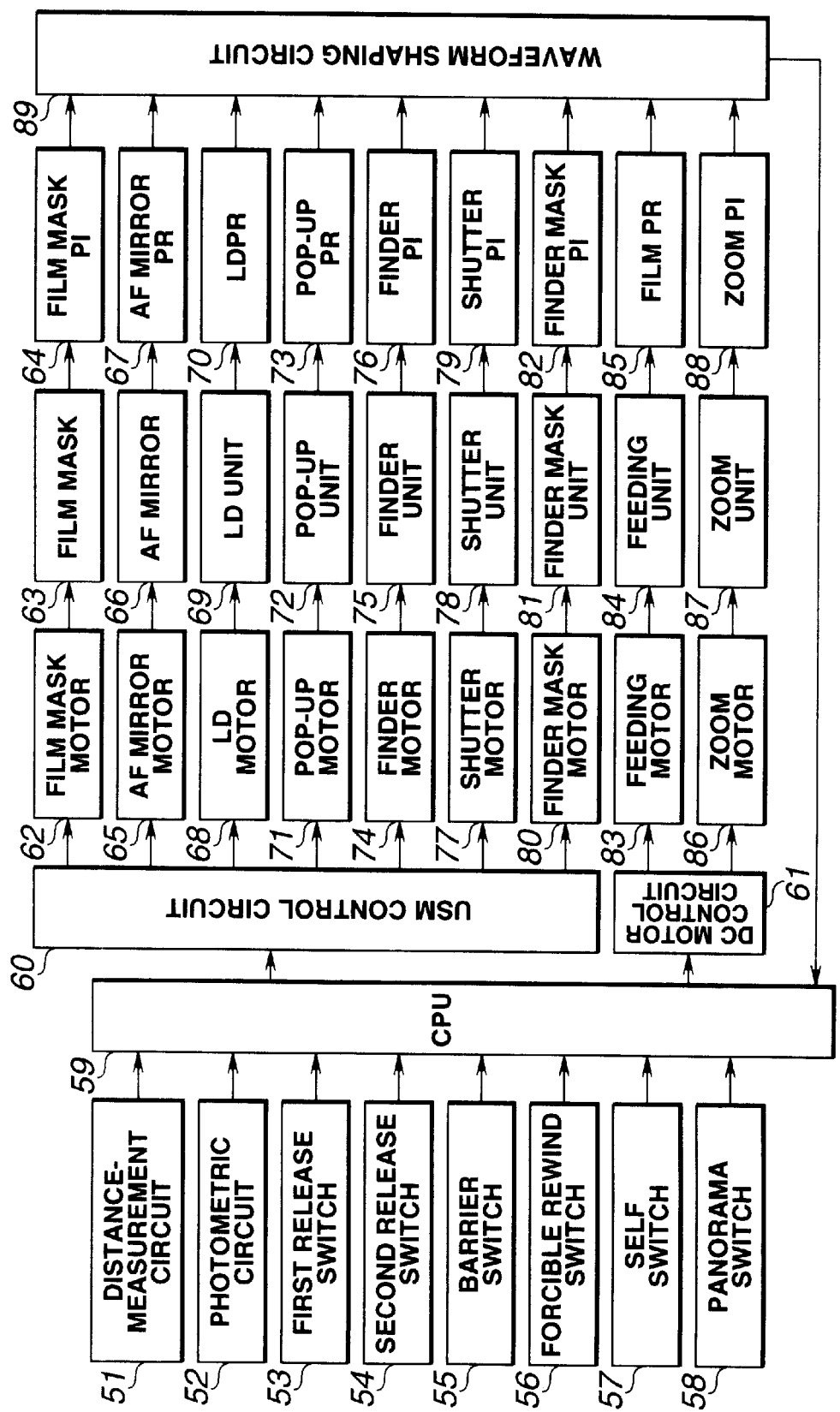
FIG. 10 is a block diagram mainly showing an electric arrangement of a camera according to the fifth embodiment of the present invention.

FIG. 10 is a block diagram mainly showing the electric arrangement of a camera.

This camera has a distance-measurement circuit 51 for measuring a distance to an object to be photographed a photometric circuit 52 for measuring the luminance of the object a first release switch 53 and a second release switch 54 which are constituted by a two-step switch for instructing and inputting a photographing operation, a barrier switch 55 which also serves as a main switch, is turned on/off by opening/closing a barrier during the photographing operation, a forcible rewind switch 56 for forcibly rewinding a film a self switch 57 for performing a self-timer photographing operation and a panorama switch 58 for performing a switching operation between a normal photographing format and a panorama photographing format. Outputs from the circuits and the switches are designed to be input to a CPU 59.

In addition, a drive system for driving a movable unit of this camera has seven ultrasonic motors (USMs) controlled by the CPU 59 through the USM control circuit 60. The seven USMS include a film mask motor 62, an AF mirror motor 65, a lens drive (LD) motor 68, a pop-up motor 71, a finder motor 74, a shutter motor 77, a finder mask motor 80. The drive system two DC motors, including a feeding motor 83 and a zoom motor 86, both of which are controlled by the CPU 59 through the DC motor control circuit 61.

The film mask motor 62 regulates an exposure range to a film to drive a film mask 63 for changing a photographing format. The state of the film mask 63 is detected by a film mask photo-interrupter PI (film mask PI) 64 as a binary value consisting of a transmission state and a shielding state.

The AF mirror motor 65 is used to drive an AF mirror 66 that guides light from a photographing lens to an AF sensor 51a (see FIG. 16A) in the distance-measurement circuit 51. The position of the AF mirror 66 is detected by an AF mirror photoreflector (AF mirror PR) 67.

The LD motor 68 is used to drive an LD unit 69 serving as a lens unit for focusing the photographing lens. The state of the LD unit 69 is detected by an LD photoreflector (LDPR) 70.

The pop-up motor 71 is used to vertically drive a pop-up unit 72 in which a light-emitting portion of an electronic flash is built at a position where the pop-up unit 72 is stored in a camera, and a position where the pop-up unit 72 extends from the camera. The position of the pop-up unit 72 is detected by a pop-up photoreflector (pop-up PR) 73.

The finder motor 74 is to drive a finder lens in the finder unit 75 in accordance with a zoom state of the photographing lens. The state of the finder unit 75 is detected by a finder photo-interrupter (finder PI) 76.

The shutter motor 77 is used to drive a shutter unit 78 that regulates time in which light from the photographing lens is transmitted to the film side and an aperture of the lens. The position of the shutter unit 78 is detected by a shutter photo-interrupter (shutter PI) 79.

The finder mask motor 80 is used to drive a finder mask unit 81 such that a normal state or a panorama state is set in the finder in accordance with the state of the panorama switch 58. The position of the finder mask unit 81 is detected by a finder mask photo-interrupter (finder mask PI) 82.

The feeding motor 83 is used to drive a feeding unit 84 that feeds a film. The feeding state of the film is set by the feeding unit 84 such that the perforations of a film are detected by a film photo-reflector (film PR) 85.

The zoom motor 86 is used to drive a zoom unit 87 serving as a lens unit that zooms the photographing lens. The position of the zoom unit 87 is detected by a zoom photo-interrupter (zoom PI) 88.

Outputs from the above photo-interrupters or photoreflectors are shaped by a waveform shaping circuit 89 with respect to waveforms, and are input to the CPU 59 to be used to control the above motors.

Figure 11:
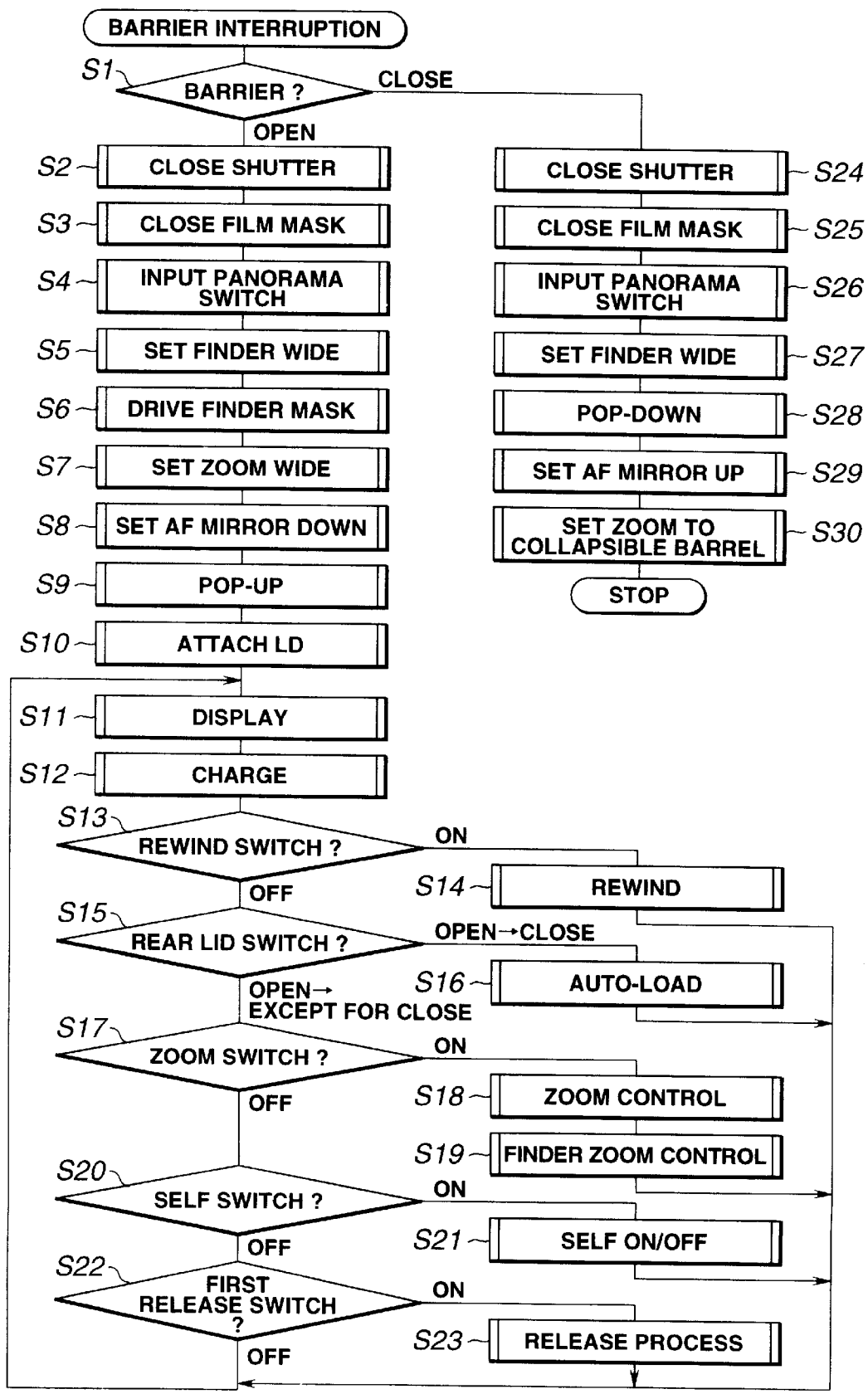
FIG. 11 is a flow chart showing a main operation of the camera according to the fifth embodiment.

FIG. 11 is a flow chart showing a main operation of the camera.

When the main operation is performed by an interruption caused by the barrier switch 55 changed in accordance with an operation of opening/closing a barrier, the opening/closing state of the barrier is checked (step S1). If the barrier is opened, the shutter unit 78 is closed (step S2), and the film mask 63 is closed (step S3). When the shutter unit 78 or the film mask 63 has been closed, no operation is not performed.

The input of the panorama switch 58 is checked (step S4), and the finder unit 75 is driven to a wide position (step S5).

After the finder mask unit 81 is driven in accordance with the state of the panorama switch 58 (step S6), the zoom unit 87 extends to a wide position (step S7).

Subsequently, the AF mirror 66 is moved downward to make an AF operation performed by the distance-measurement circuit 51 possible (step S8), the pop-up unit 72 including the light-emitting portion of the electronic flash is popped up (step S9), and the LD unit 69 for focusing the lens is attached in a withdrawing direction (step S10).

The processes in subsequent steps S11 to S23 are loop processes.

A display operation required for an external display device such as an LCD and a display device in the finder is performed (step S11), and a capacitor for the electronic flash is charged (step S12).

It is detected whether the forcible rewind switch 56 has been pressed (turned on) (step S13). If the ON state is detected, the film is rewound (step S14), and the flow returns to step S11.

When the forcible rewind switch 56 is not pressed, it is detected whether a rear lid switch is changed from an open state to a closed state (step S15). If the change from the open state to the closed state is detected, the film is automatically loaded (step S16), and the flow returns to step S11.

In addition, if it is not detected that the rear lid has been changed from the open state to the closed state, it is checked whether the zoom switch is operated (step S17). If the operation of the zoom switch is detected, the zoom unit 87 of the photographing lens is controlled to be driven (step S18). The finder unit 75 is zoom-controlled in accordance with a zoom position of the zoom unit 87 (step S19). Thereafter, the flow returns to step S11.

Subsequently, if the zoom switch is not operated, it is detected whether the self switch 57 is turned on (step S20). Each time it is checked that the self switch 57 is turned on, the ON/OFF state of a self mode is changed (step S21), and the flow returns to step S11.

In addition, if the self switch 57 is not turned on, it is checked whether the first release switch 53 is turned on (step S22). If the first release switch 53 is turned on, a release process for driving the shutter unit 78 is performed (step S23), and the flow returns to step S11. If the first release switch 53 is turned off, the flow returns to step S11.

If it is detected in step S1 that the barrier is closed, the shutter unit 78 is closed (step S24), and the film mask 63 is closed (step S25). If the shutter unit 78 and the film mask 63 have been closed, operation is performed.

The input of the panorama switch 58 is checked (step S26), and the finder unit 75 is driven to a wide position (step S27). After the pop-up unit 72 including the light-emitting portion of the electronic flash is popped down (step S28), the AF mirror 66 is moved upward (step S29), and, by driving the zoom unit 87, the photographing lens is withdrawn until the photographing lens is in a barrel-collapse state (step S30). Thereafter, the CPU 59 is set in a stop state.

Figure 12:
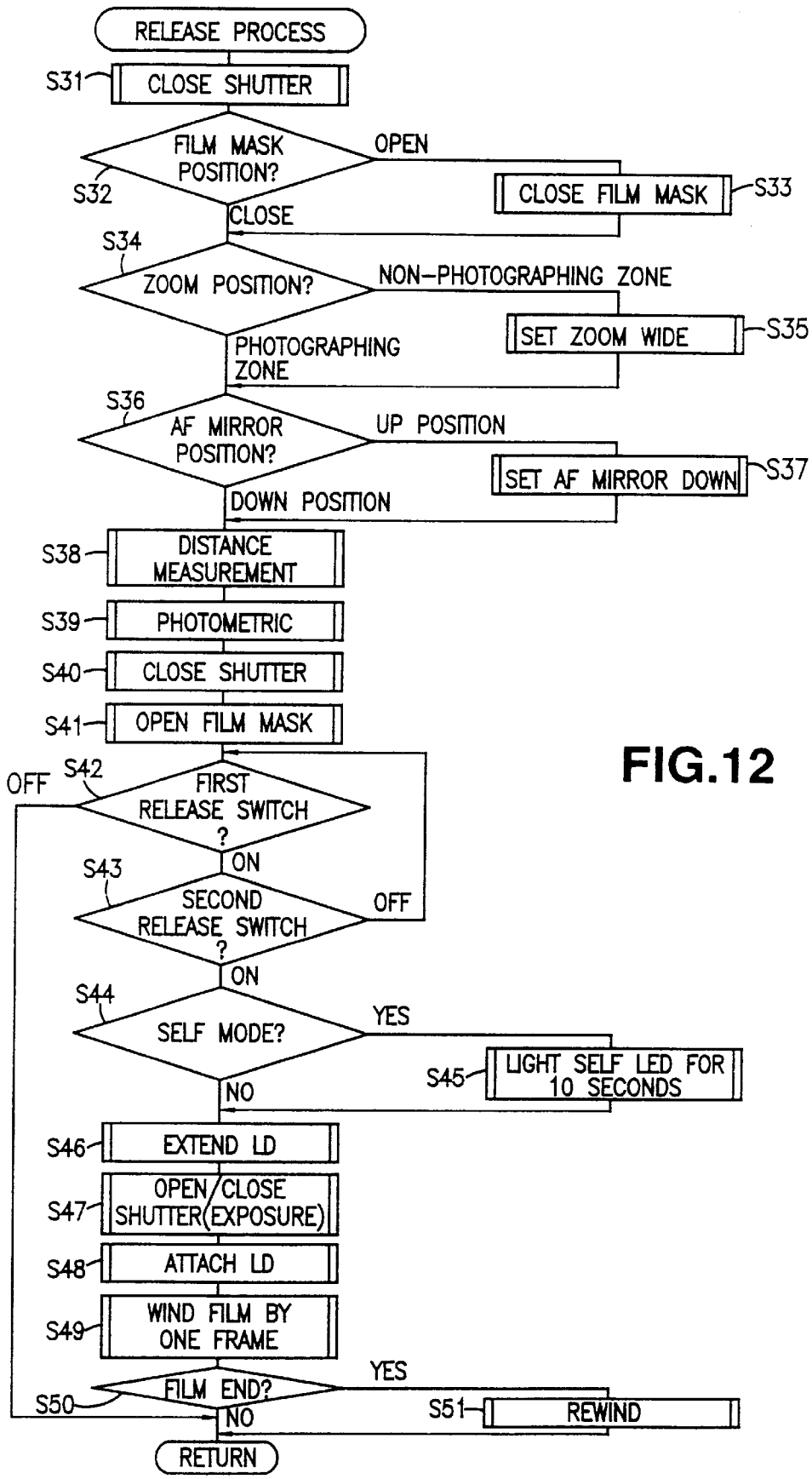
FIG. 12 is a flow chart showing the details of a release process in FIG. 11.

FIG. 12 is a flow chart showing the details of the release process in step S23 in FIG. 11.

When the release process is started, first, the shutter unit 78 is closed (step S31). If the shutter unit 78 has been closed, no operation is performed.

The position of the film mask 63 is detected (step S32). If the film mask 63 is detected to be at a position where the film mask 63 is open, the film mask 63 is closed (step S33). If the film mask 63 is detected to be at a position where the film mask 63 is closed, the flow shifts to the next step.

The position of the zoom unit 87 is detected (step S34). If it is detected that the zoom position is in a non-photographing zone, the zoom unit 87 is moved to a wide position (step S35). If it is detected that the zoom position is in a photographing zone, the flow shifts to the next step.

The position of the AF mirror 66 is detected (step S36). If it is detected that the AF mirror 66 is not located at a down position where an AF operation can be performed, the AF mirror 66 is moved downward (step S37).

In this manner, light which is incident from the photographing lens passes through the shutter unit 78, and then is inhibited from reaching the film by the film mask 63. At this time, the light is reflected by the AF mirror 66 to reach an AF sensor 51a (see FIG. 16A).

If it is detected in step S36 that the AF mirror 66 is located at the down position, the flow shifts to the next step. A distance-measurement operation is performed by the distance-measurement circuit 51 (step S38), and a photometric operation is performed by the photometric circuit 52 (step S39).

Subsequently, the shutter unit 78 is closed (step S40), the film mask 63 is opened (step S41), and the shutter unit 78 is opened or closed to make it possible to perform exposure.

The state of the first release switch 53 is checked (step S42). If the first release switch 53 is in an OFF state, the release process is ended. If the first release switch 53 is in an ON state, the state of the second release switch 54 is checked (step S43).

When the second release switch 54 is in an OFF state, the flow returns to step S43. If it is detected that the second release switch 54 is turned on, a photographing process in the steps following step S44 is performed.

More specifically, it the state of the self switch 57 is checked to determine whether a self mode is set (step S44). If the self mode is set, a self LED is lit, for example, for 10 seconds (step S45).

The LD unit 69 serving as the focusing lens is extended on the basis of distance-measurement data output from the distance-measurement circuit 51 (step S46), and the shutter unit 78 is opened/closed on the basis of data such as a photometric value output from the photometric circuit 52 and other film sensitivity (step S47).

If it is determined that auxiliary light is required for low luminance of an object, the electronic flash in the pop-up unit 72 is caused to emit light while the shutter unit 78 is opened.

Upon completion of the exposure operation, the LD unit 69 serving as a focusing lens is driven to be attached to the withdrawing side (step S48), and the film is wound by one frame (step S49). Thereafter, it is detected whether the film end is detected (step S50). If the film end is detected, the film is rewound (step S51). If the film end is not detected, the release process is completed.

FIG. 13 is a view showing the arrangement of a film mask of a camera. FIGS. 14A, 14B, and 14C are a front view, a right-side view, and a plan view, respectively showing the arrangement of a film motor.

The film mask 63 is movably arranged at a position where the film mask 63 partially covers an aperture 103 located on the moving path of a film 102a drawn from a film cartridge 102 loaded on the camera 101 and a position where the film mask 63 is retracted. As shown in FIG. 13, the film mask 63 has two members, i.e., an upper film mask 63a and a lower film mask 63b.

The upper and lower film masks 63a and 63b are penetrated through by a guide shaft 63g by using cylindrical portions 63c and 63d extending from one end of the upper and lower film masks 63a and 63b such that the upper and lower film masks 63a and 63b can be vertically moved.

Arm portions 63e and 63f extend from the one end of the upper and lower film masks 63a and 63b, and are meshed with a screw shaft 62a whose end portions are each chased in opposite directions. The arm portion 63e of these arm portions can be engaged with a stopper 58a formed on the camera body, so that the film masks 63a and 63b are suppressed from being more retracted.

A disk-like member on which slits are radially formed is fixed to the upper end portion of the screw shaft 62a, so that the rotating position of the screw shaft 62a is detected by the film mask PI 64.

The film mask motor 62 constituted by an ultrasonic motor is attached to an almost central portion of the screw shaft 62a. As shown in FIGS. 14A, 14B, and 14C, the film mask motor 62 is constituted such that a vibration member 62d to which a piezoelectric element 62e is adhered is brought into press contact with the screw shaft 62a by using a fixing member 62c, and is similar to that of the first embodiment shown in FIGS. 3A, 3B, and 3C.

More specifically, the piezoelectric element 62e is adhered to one surface of the vibration member 62d having an almost rectangular parallelopiped shape. On the surface opposing the surface on which the piezoelectric element 62e is adhered, as shown in FIG. 14A, four projections 62g extend. Of these projections, the two inner projections 62g are arranged on this side, and the two outer projections 62g are arranged on the other side. The above vibration member 62d is held to be interposed by the fixing member 62c having an almost U shape. An end portion of the fixing member 62c is fitted in the peripheral surface of the engagement portion 62b of the screw shaft 62a to pivotally hold the screw shaft 62a. The engagement portion 62b is formed such that the upper and lower portions of the engagement portion 62b in which the fixing member 62c is fitted have large diameters to allow the screw shaft 62a to rotate and to regulate the vertical movement of the screw shaft 62a.

A pair of screws 62f are penetrated through and are meshed with the fixing member 62c, and the penetrating ends are brought into contact with the piezoelectric element 62e. By adjusting the amounts of meshing of the screws 62f, the pressing force acting when the four projections 62g of the vibration member 62d are brought into contact with the peripheral surface of the screw shaft 62a can be adjusted to an appropriate force.

The main operation of the arrangement as shown in FIGS. 13, 14A, 14B, and 14C is as follows.

When the screw shaft 62a is rotated in a clockwise direction when viewed from the above, the upper film mask 63a moves downward, and the lower film mask 63b moves upward. In this manner, a film in a state wherein an AF operation is performed or the barrier is closed is shielded from light.

The upper and lower film masks 63a and 63b have the following positional relationship. When the upper and lower film masks 63a and 63b are closed with respect to each other after moving to a predetermined position, the arm portions 63e and 63f are brought into contact with the fixing member 62c which thereby functions as a stopper.

In this manner, since the film masks 63a and 63b cannot further move from the position where the film masks 63a and 63b are brought into contact with each other, the screw shaft 62a cannot be rotated and is stopped.

On the other hand, when the screw shaft 62a is rotated in a counterclockwise direction when viewed from the above, the interval between the film masks 63a and 63b can be increased.

When the screw shaft 62a is rotated as described above, the film masks 63a and 63b can be moved to a position corresponding to a panorama state wherein the upper and lower portions of the opening of the aperture 103 are partially shielded from light, or the film masks 63a and 63b can be moved to a position corresponding to a normal state wherein the opening of the aperture 103 is not shielded.

When the film masks 63a and 63b reach predetermined positions such that they are spaced apart from each other, the arm portion 63e of the film mask 63a is engaged with the stopper 58a and suppressed from being further moved, and the screw shaft 62a cannot be rotated and is stopped. For this reason, the lower film mask 63b is also stopped at the same position.

Figure 15:
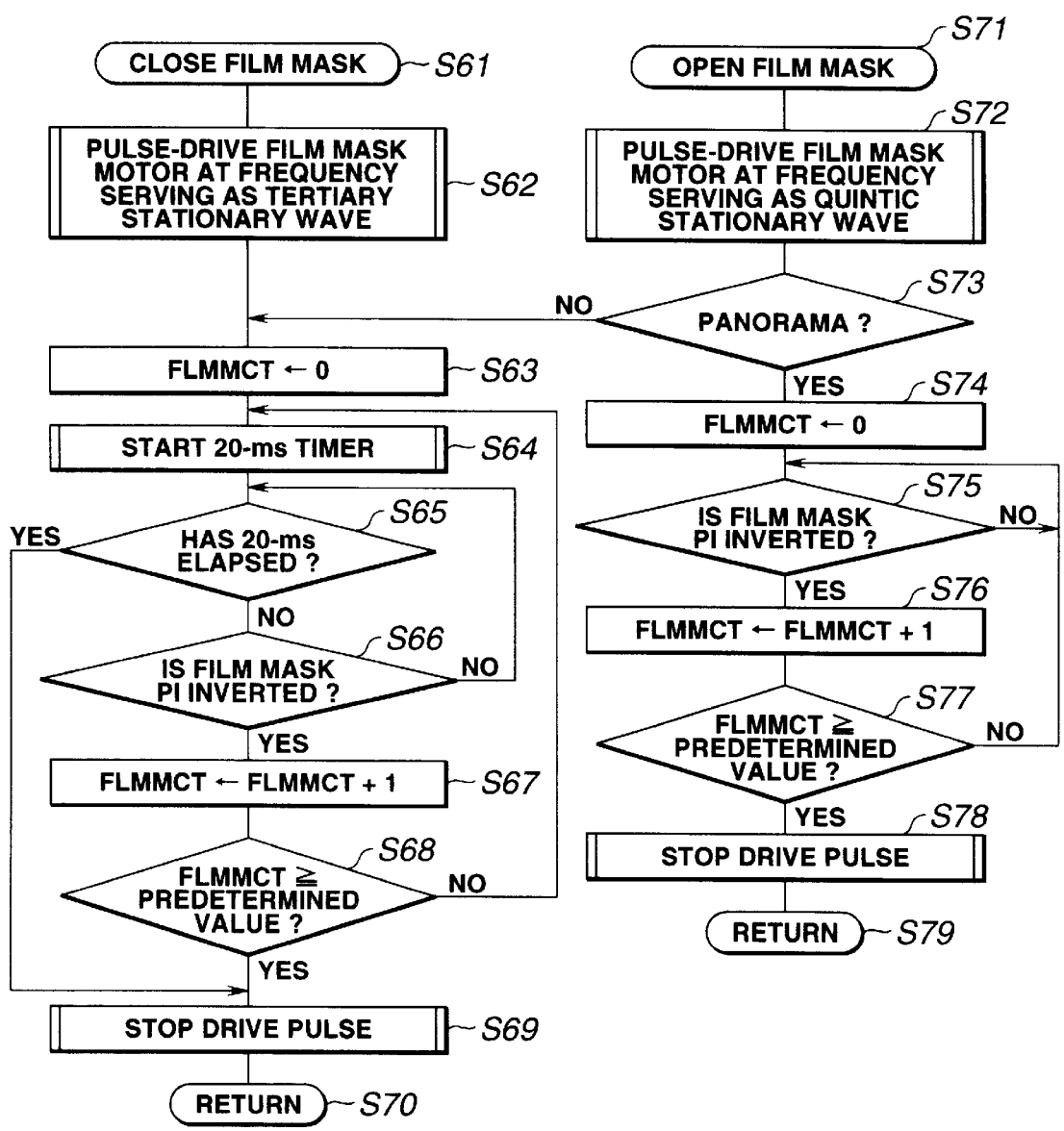
FIG. 15 is a flow chart showing an opening/closing operation of the film mask according to the fifth embodiment.

Subsequently, FIG. 15 is a flow chart showing an opening/closing operation of the above film masks.

When an operation of closing the film mask 63 is started (step S61), the film mask motor begins to be driven by a pulse voltage having a frequency at which a tertiary stationary wave is generated by the vibration member 62d (step S62).

A counter FLMMCT for counting pulses of the film mask PI 64 is reset to zero (step S63), a 20 ms timer is started (step S64). It is checked whether 20 ms has elapsed (step S65). If the time has not elapsed, it is checked whether an output from the film mask PI 64 is inverted (step S66). If the output is not inverted, the flow returns to step S65.

When the output from the film mask PI 64 is inverted in step S66, the counter FLMMCT is incremented every inversion (step S67) to check whether the value of the counter FLMMCT has reached a predetermined value (step S68). If NO in step S68, the flow returns to step S64.

If the value of the counter FLMMCT has reached the predetermined value, or if time of 20 ms or more has elapsed before the output from the film mask PI 64 inverts, a drive pulse supplied to the film mask motor 62 is stopped (step S69), the flow returns to the main routine (step S70).

More specifically, the rotation is stopped if a time of 20 ms or more has elapsed before the output from the film mask PI 64 inverts, or if pulses are sequentially generated by the film mask PI 64 to make the value of the counter FLMMCT a predetermined value or more. For this reason, it can be detected that the arm portions 63e and 63f are reliably attached to the fixing member 62c.

On the other hand, when an operation of opening the film mask 63 is started (step S71), the film mask motor begins to be driven by a pulse voltage having a frequency at which a quintic stationary wave is generated by the vibration member 62d (step S72).

It is checked whether the camera is set in a panorama mode (step S73). If the camera is set in the panorama mode, the flow jumps to step S63.

When the camera is set in the panorama mode, the counter FLMMCT is reset to zero (step S74), the CPU waits until an output from the film mask PI 64 has inverted (step S75), the counter FLMMCT is incremented every inversion (step S76) to check whether the value of the counter FLMMCT has reached a predetermined value (step S77). If NO in step S77, the flow returns to step S75.

In this manner, if the value of the counter FLMMCT reaches the predetermined value, a drive pulse supplied to the film mask motor 62 is stopped (step S78). At this time, the arm portion 63e is engaged with the stopper 58a. Therefore, the flow returns to the main routine (step S79).

Figure 16A:
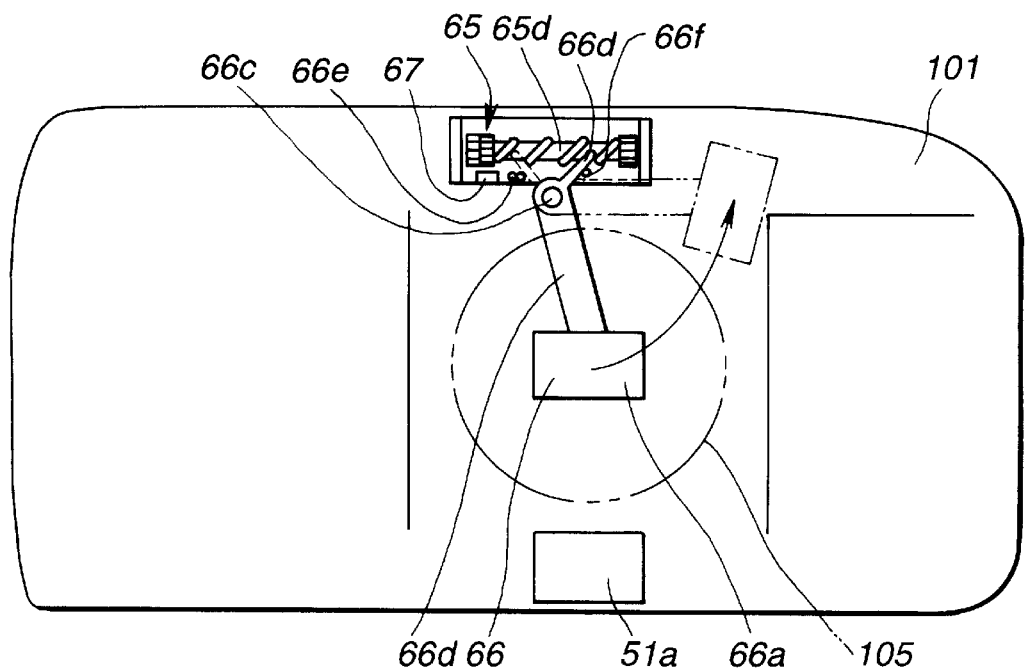
FIG. 16A is a front view showing the arrangement of an AF mirror of the camera according to the fifth embodiment.
Figure 16B:
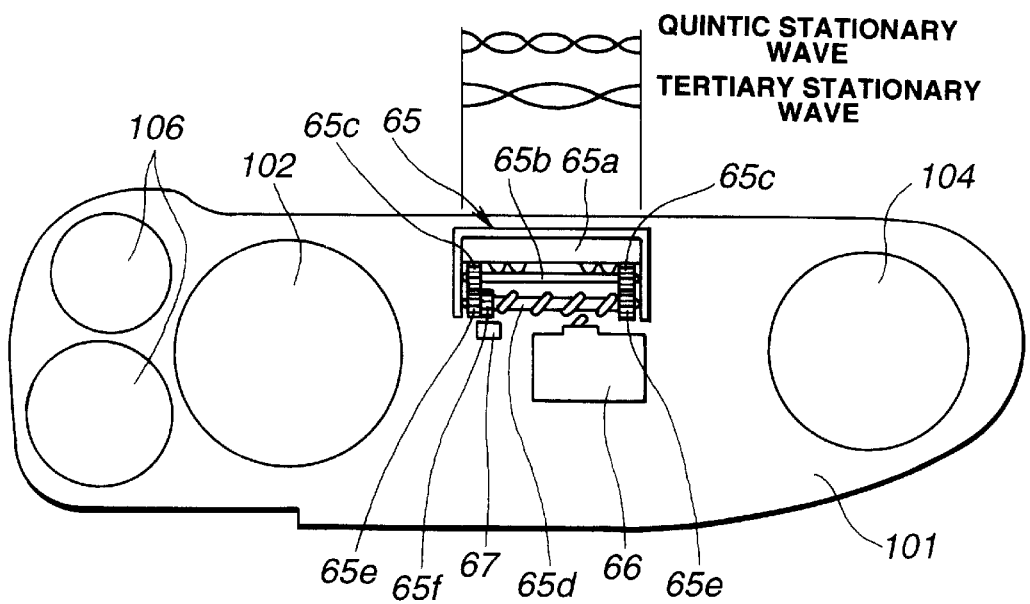
FIG. 16B is a plan view showing the arrangement of the AF mirror of the camera according to the fifth embodiment.
Figure 17:
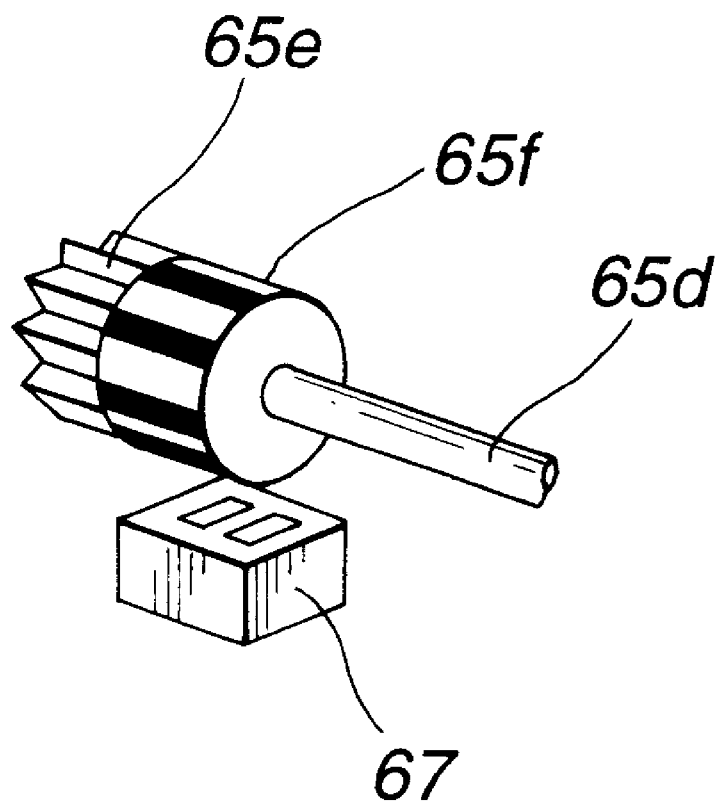
FIG. 17 is a perspective view showing the arrangement of an AF mirror photoreflector of the camera according to the fifth embodiment.

FIGS. 16A and 16B are front and plan views, respectively, showing the arrangement of an AF mirror of a camera, and FIG. 17 is a perspective view showing the arrangement of an AF mirror photoreflector.

In this camera 101, a member 106 such as a battery is stored inside a holding portion used to hold the camera with a right hand, a film cartridge 102 is loaded near the member 106. A film drawn from the film cartridge 102 is to be stored in a spool chamber 104 arranged on the opposite side through the photographing lens barrel 105.

The AF mirror 66 is arranged behind the optical axis of the photographing lens held in the photographing lens barrel 105.

The AF mirror 66 is constituted such that a rectangular mirror surface portion 66a inclined at about 45° downward with respect to the front surface of the camera is attached to the end portion of an arm 66b pivotally arranged by a support pin 66c. In this manner, light which is incident from the photographing lens is designed to be reflected by the AF mirror 66a and to be incident on the AF sensor 51a attached to the inner bottom surface of the camera 101.

An engagement arm 66d having a small diameter extends from the other side of the arm 66b through the support pin 66c in a slightly inclined direction. The distal end portion of the engagement arm 66d is engaged with the groove of a feeding screw shaft 65d. By rotating the feeding screw shaft 65d, the arm 66b is rotated about the support pin 66c, and the mirror surface portion 66a moves in an almost vertical direction.

In addition, stopper pins 66e and 66f are arranged on the moving path of the engagement arm 66d, so that the AF mirror 66a is stopped at a target position.

More specifically, when the feeding screw shaft 65d is rotated in a clockwise direction when viewed from the right side, the mirror surface portion 66a moves to an almost obliquely upper right direction by engagement with the screw shaft 65d, and is stopped at a position where the engagement arm 66d and the stopper pin 66e. At this time, the mirror surface portion 66a is retracted from a range in which a beam being incident from the photographing lens passes.

On the other hand, when the feeding screw shaft 65d is rotated in a counterclockwise direction when viewed from the right side, and the mirror surface portion 66a is moved in an almost obliquely lower left direction to be stopped at a position where the engagement arm 66d and the stopper pin 66f are brought into contact with each other. At this time, the mirror surface portion 66a is located at a predetermined position to reflect light to the AF sensor 51a.

The feeding screw shaft 65d as described above is designed to be driven by the AF mirror motor 65 constituted by an ultrasonic motor.

More specifically, the AF mirror motor 65 brings a vibration member 65a to which a piezoelectric element is adhered into press contact with a rotating member 65b by using an almost U-shaped fixing member to apply a pulse voltage, so that the vibration member 65a is rotatably driven. Drive force transmission gears 65c are fixed to both the end portions of the rotating member 65b.

The feeding screw shaft 65d is pivotally supported by the fixing member of the AF mirror motor 65, and gears 65e to be meshed with a gear 65c of the rotating member 65b are fixed to both the ends of the feeding screw shaft 65d. In addition, a cylindrical portion 65f, to be detected, in which white and black patterns as shown in FIG. 17 are alternately formed in a peripheral direction is arranged on one end portion of the feeding screw shaft 65d, so that the rotating state of the portion 65f to be detected is detected by the AF mirror PR 67. Any one of the ultrasonic motors used in the first to fourth embodiments may be used as the ultrasonic motor used for the AF mirror motor.

Figure 18:
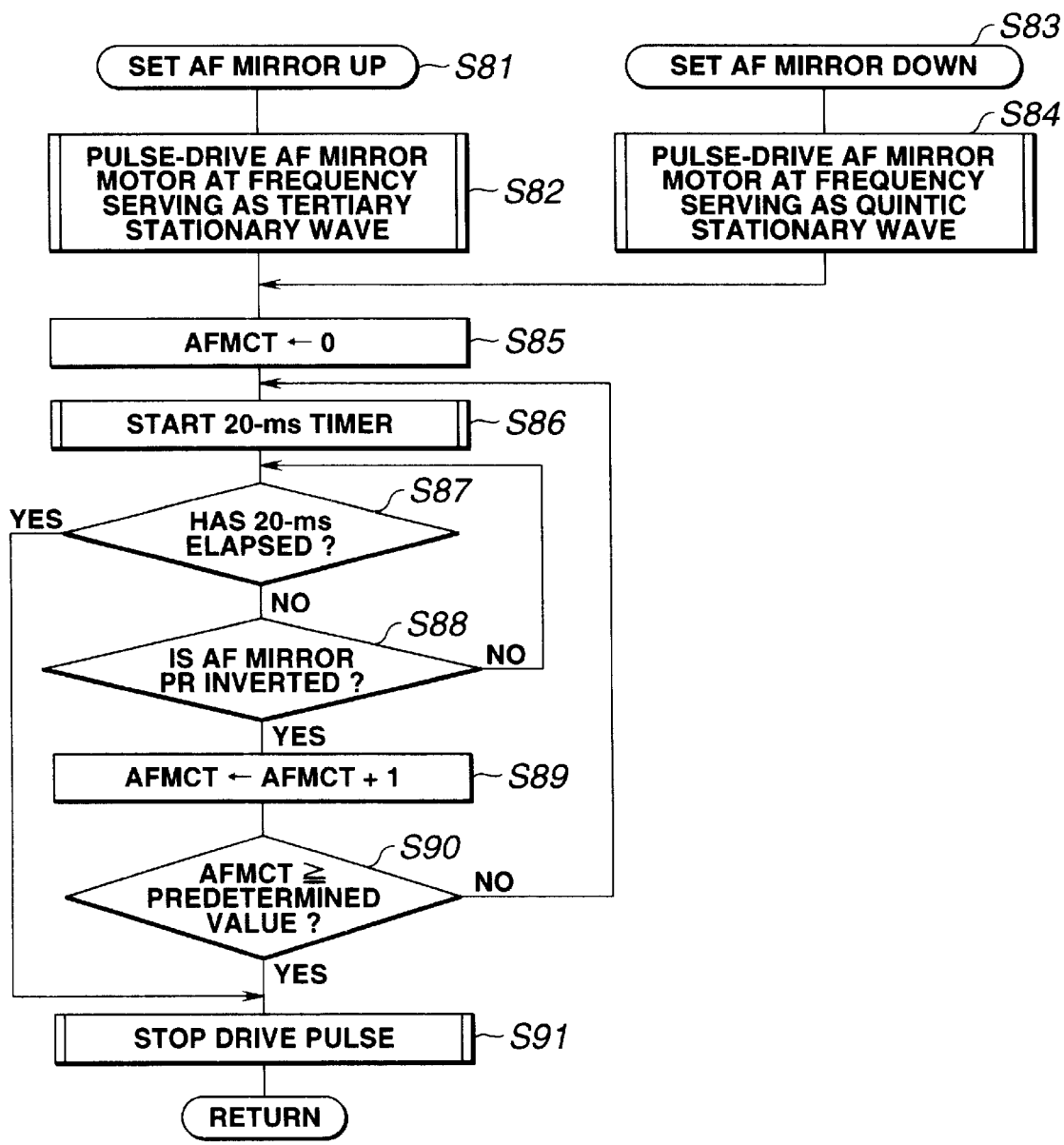
FIG. 18 is a flow chart showing an operation of setting up/down the AF mirror of the camera according to the fifth embodiment.

FIG. 18 is a flow chart showing an operation of moving the AF mirror up/down as described above.

When moving the AF mirror 66 up (step S81), the AF mirror motor begins to be driven by a pulse voltage having a frequency at which a tertiary stationary wave is generated by the vibration member 65a (step S82).

A counter AFMCT for counting pulses of the AF mirror PR 67 is reset to zero (step S85), and a 20 ms timer is started (step S86). It is checked whether 20 ms has elapsed (step S87). If NO in step S87, it is checked whether an output from the AF mirror PR 67 is inverted (step S88). If NO in step S88, the flow returns to step S87.

On the other hand, when the output from the AF mirror PR 67 is inverted in step S88, the counter AFMCT is incremented every inversion (step S89) to check whether the value of the counter AFMCT has reached a predetermined value (step S90). If NO in step S90, the flow returns to step S86.

If the value of the counter AFMCT has reached the predetermined value, or if time of 20 ms or more has elapsed before the output from the AF mirror PR 67 inverts, a drive pulse supplied to the AF mirror motor 65 is stopped (step S91).

More specifically, rotation is stopped when a time of 20 ms or more has elapsed before the output from the AF mirror PR 67 inverts, or pulses are sequentially generated by the AF mirror PR 67 to make the value of the counter AFMCT a predetermined value or more. For this reason, it can be detected that the engagement arm 66d is reliably attached to the stopper pin 66e to stop the AF mirror 66.

When an operation of moving down the AF mirror 66 is started (step S83), the AF mirror motor begins to be driven by a pulse voltage having a frequency at which a quintic stationary wave is generated by the vibration member 65a (step S84). Thereafter, the flow shifts to step S85, the AF mirror motor is driven until the engagement arm 66d is attached to the stopper pin 66f to stop the AF mirror 66.

Figure 19:
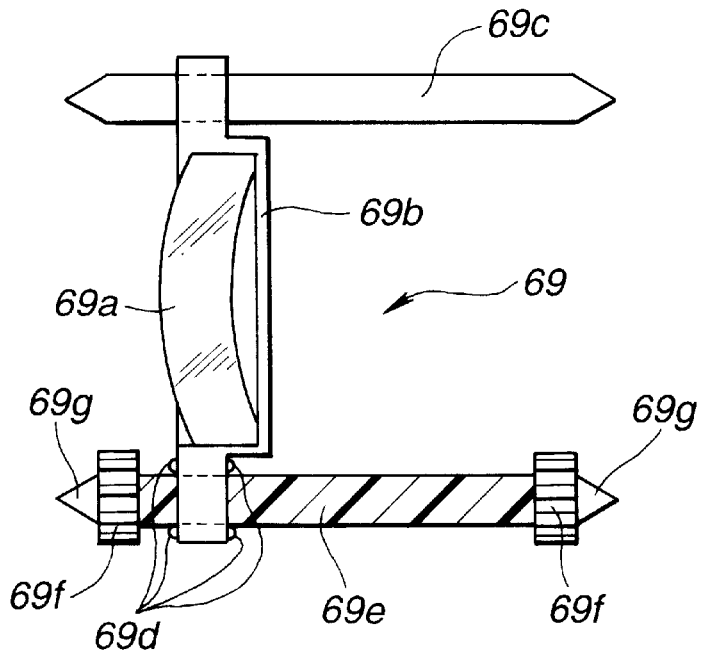
FIG. 19 is a side view showing the arrangement of an LD unit of the camera according to the fifth embodiment.
Figure 20:
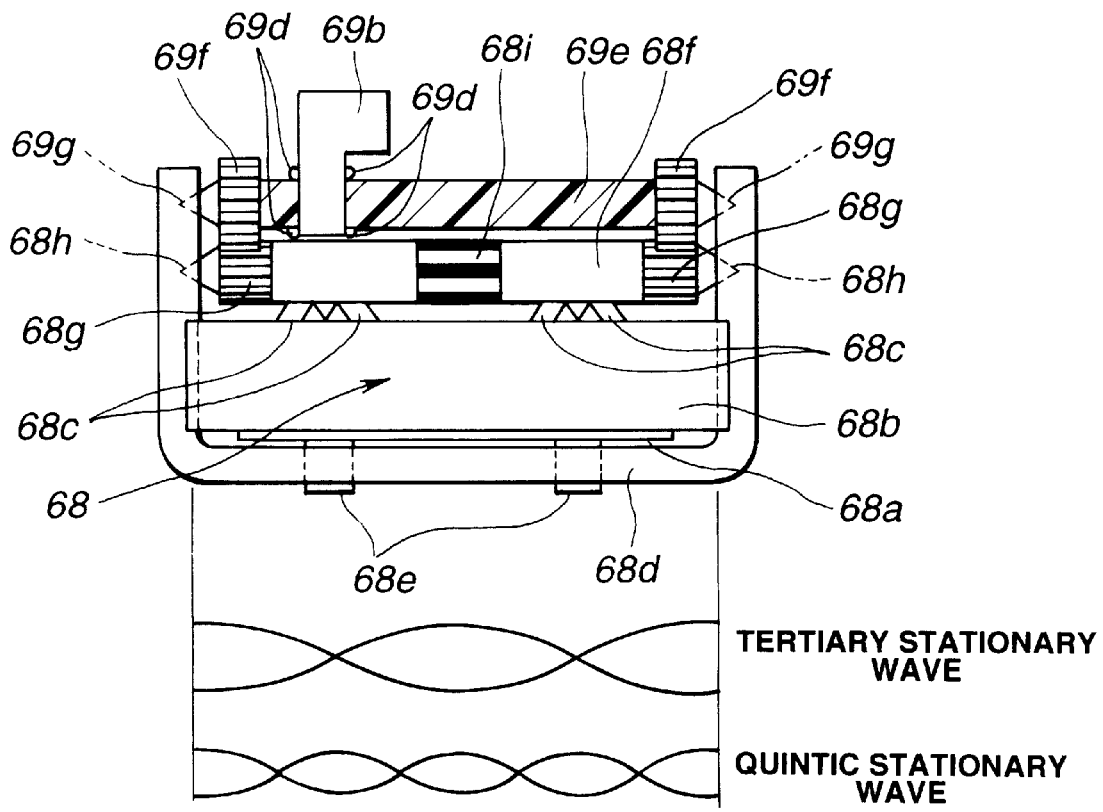
FIG. 20 is a side view showing the arrangement of an LD motor of the camera according to the fifth embodiment.

FIG. 19 is a side view showing the arrangement of an LD unit of the camera, and FIG. 20 is a side view showing the arrangement of an LD motor. The LD unit 69 is constituted by a focusing lens 69a, a holding member 69b for holding the focusing lens 69a, a suspended shaft 69c which is slidably penetrated through one end of the holding member 69b, and a feeding screw shaft 69e meshed with the other end of the holding member 69b. A plurality of projections 69d extend from both the side surfaces of a portion of the holding member 69b meshed with the feeding screw shaft 69e. When an extending/withdrawing operation of the holding member 69b is performed by rotating the feeding screw shaft 69e, the holding member 69b is attached to the side surface of a gear 69f (to be described later) of the feeding screw shaft 69e.

The gears 69f are fixed to both end portions of the feeding screw shaft 69e, and both of the end portions serve as sharp ends 69g.

The feeding screw shaft 69e is rotationally driven such that tertiary and quintic stationary waves are generated by the LD motor 68 constituted by an ultrasonic motor to rotate a rotating member 68f (to be described later) in a forward or backward direction, thereby moving the holding member 69b.

The LD motor 68, as shown in FIG. 20, is constituted such that a vibration member 68b to which a piezoelectric element 68a is adhered is brought into press contact with the rotating member 68f by using a fixing member 68d.

More specifically, the piezoelectric element 68a is adhered to one surface of the vibration member 68b having an almost rectangular parallelopiped shape, four projections 68c extend from the surface of the vibration member 68b opposing the surface to which the piezoelectric element 68a is adhered. These projections 68c are arranged in the same manner as that shown in FIGS. 5A, 5B, 5C, 5D, and 5E. Here, although the projections 68c have shapes shown in FIGS. 5A, 5B, 5C, 5D, and 5E, the projections 68c may have shapes shown in FIGS. 3A, 3B, and 3C.

The vibration member 68b is held such that it is interposed between the fixing member 68d having an almost U shape. The end portions of the fixing member 68d pivotally supports sharp ends 68h formed at both the ends of the rotating member 68f.

A pair of screws 68e penetrate through the fixing member 68d to be meshed therewith, and the penetrating ends are in contact with the piezoelectric element 68a. By adjusting the amount of meshing of the screw 68e, the pressing force acting when the four projections 68c of the vibration member 68b are brought into contact with the peripheral surface of the rotating member 68f can be adjusted to an appropriate force. Gears 68g for transmitting a drive force are formed at both the ends of the rotating member 68f, and are meshed with the gears 69f of the feeding screw shaft 69e having the sharp ends 69g pivotally held by the fixing member 68d.

In this manner, since the feeding screw shaft 69e is held by the fixing member 68d constituting an ultrasonic motor, the arrangement of the drive unit can be simplified.

At a portion which is not in contact with the projections 68c of the rotating member 68f, e.g., an almost central portion, a portion 68i to be detected on which white and black patterns are alternately coated in a peripheral direction, so that the rotating state of the portion 68i is detected by the LDPR 70 (see FIG. 10).

Figure 21:
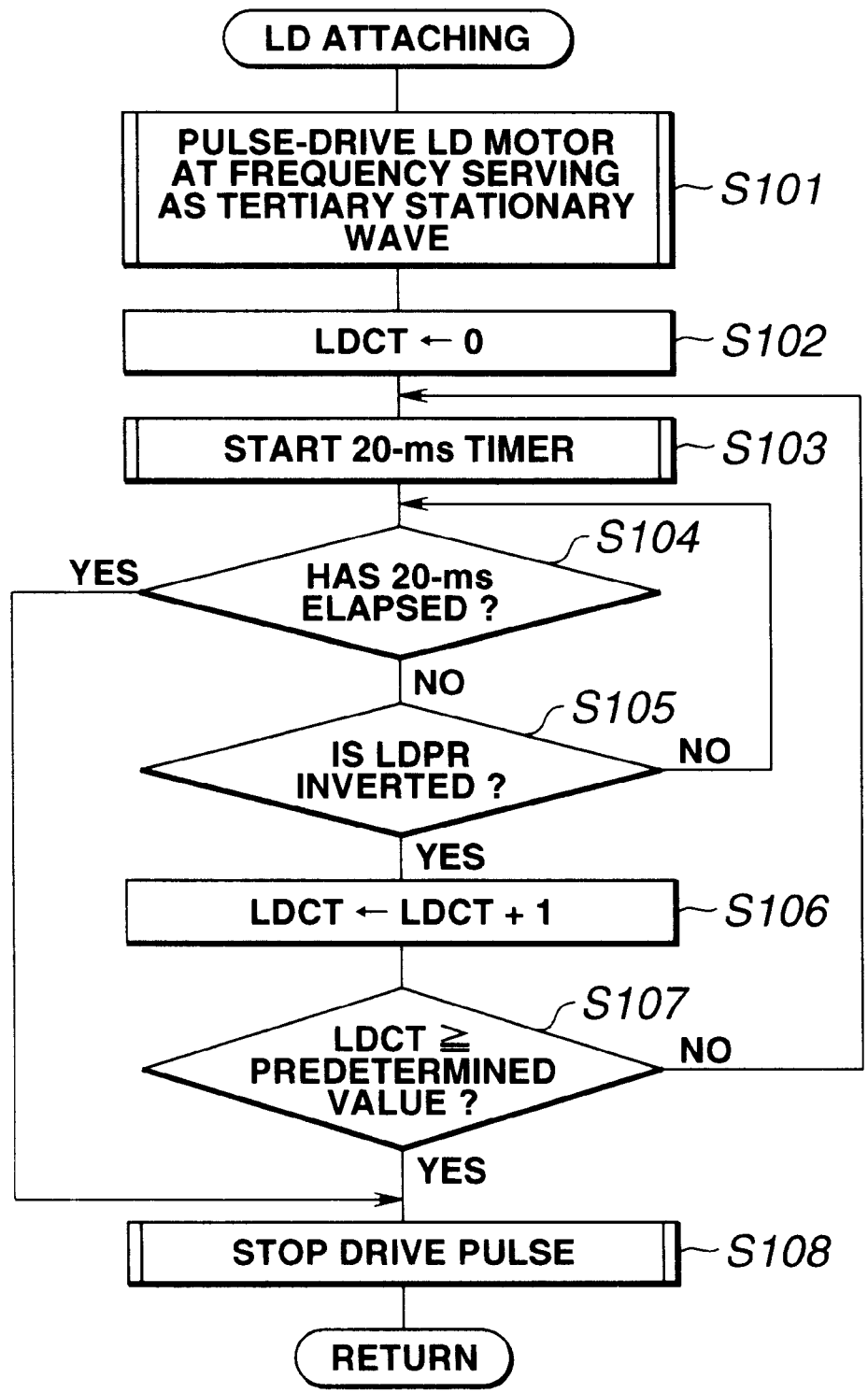
FIG. 21 is a flow chart showing an operation of withdrawing the LD unit to attach the LD unit in the camera according to the fifth embodiment.

FIG. 21 is a flow chart showing an operation of withdrawing and attaching the LD unit described above, and FIG. 22 is a flow chart showing extending the LD unit.

As shown in FIG. 21, when the operation of extending and attaching the LD unit 69 is started, the LD motor begins to be driven by a pulse voltage having a frequency at which a tertiary stationary wave is generated by the vibration member 68b (step S101).

A counter LDCT for counting pulses of the LDPR 70 is reset to zero (step S102), and a 20 ms timer is started (step S103). It is checked whether 20 ms has elapsed (step S104). If NO in step S104, it is checked whether an output from the LDPR 70 is inverted (step S105). If NO in step S105, the flow returns to step S104.

On the other hand, when the output from the LDPR 70 is inverted in step S105, the counter LDCT is incremented up every inversion (step S106) to check whether the value of the counter LDCT has reached a predetermined value (step S107). If NO in step S107, the flow returns to step S103.

If the value of the counter LDCT has reached the predetermined value, or if 20 ms or more has elapsed before the output from the LDPR 70 inverts, a drive pulse supplied to the LD motor 68 is stopped (step S108).

More specifically rotation is stopped when 20 ms or more has elapsed before the output from the LDPR 70 inverts, or pulses are sequentially generated by the LDPR 70 to make the value of the counter LDCT a predetermined value or more. For this reason, it can be detected that the projections 69d are reliably attached to the side surface of the gear 69f to stop the lens 69a.

Figure 22:
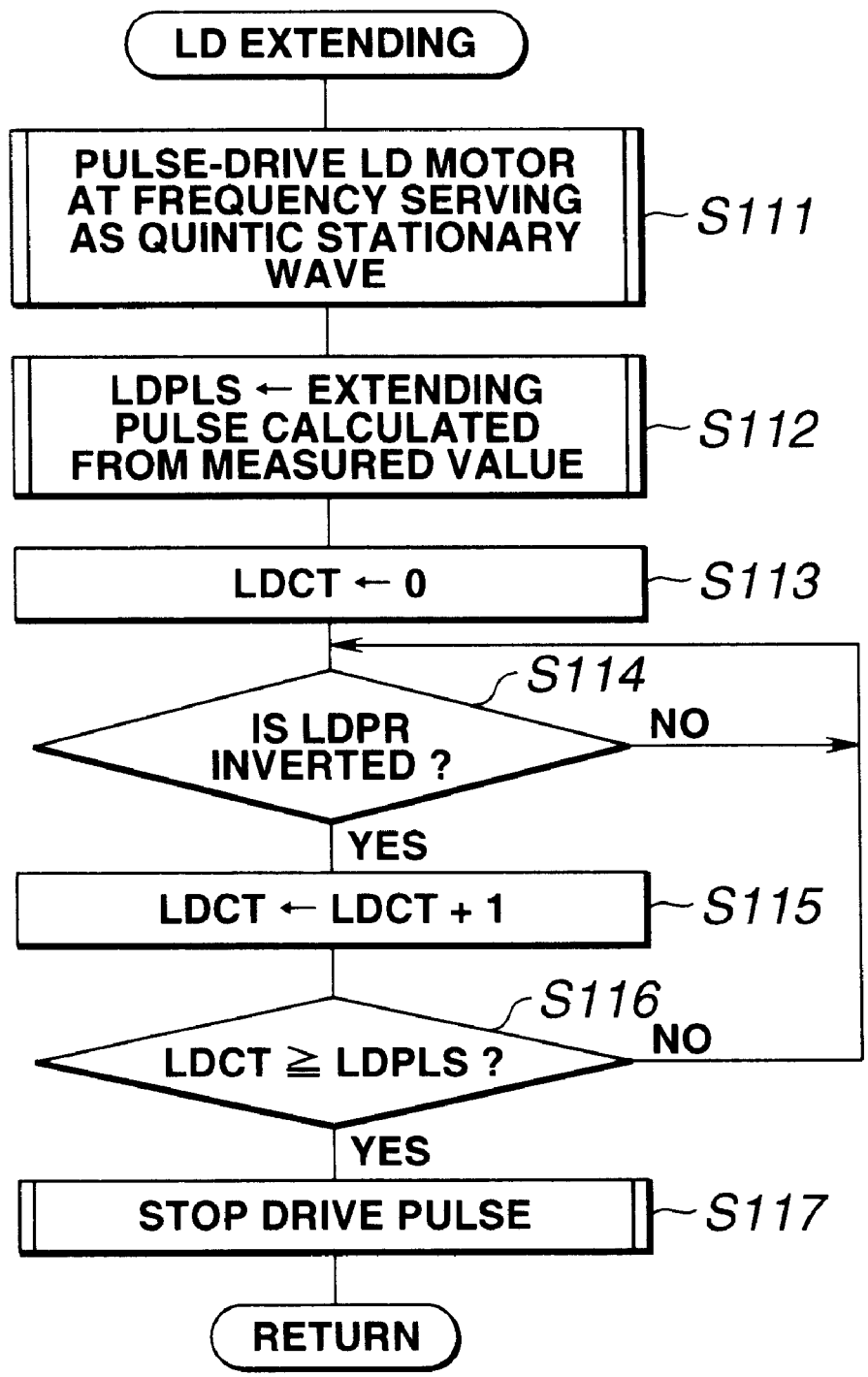
FIG. 22 is a flow chart showing an operation of extending the LD unit in the camera according to the fifth embodiment.

As shown in FIG. 22, when an operation of extending the LD unit 69 is started, the LD motor begins to be driven by a pulse voltage having a frequency at which a quintic stationary wave is generated by the vibration member 68b (step S111).

Thereafter, an extension pulse calculated from a distance measurement value is set as an LDPLS (step S112), the counter LDCT for counting pulses of the LDPR 70 is reset to zero (step S113), and the CPU waits until an output from the LDPR 70 is inverted (step S114).

When the output from the LDPR 70 is inverted, the counter LDCT is increment every inversion (step S115), and it is checked whether the counter LDCT has reached the LDPLS (step S116). If NO in step S116, the flow returns to step S114.

When the counter LDCT reaches the LDPLS, a drive pulse supplied to the LD motor 68 is stopped (step S117), and the operation is completed.

Figure 23:
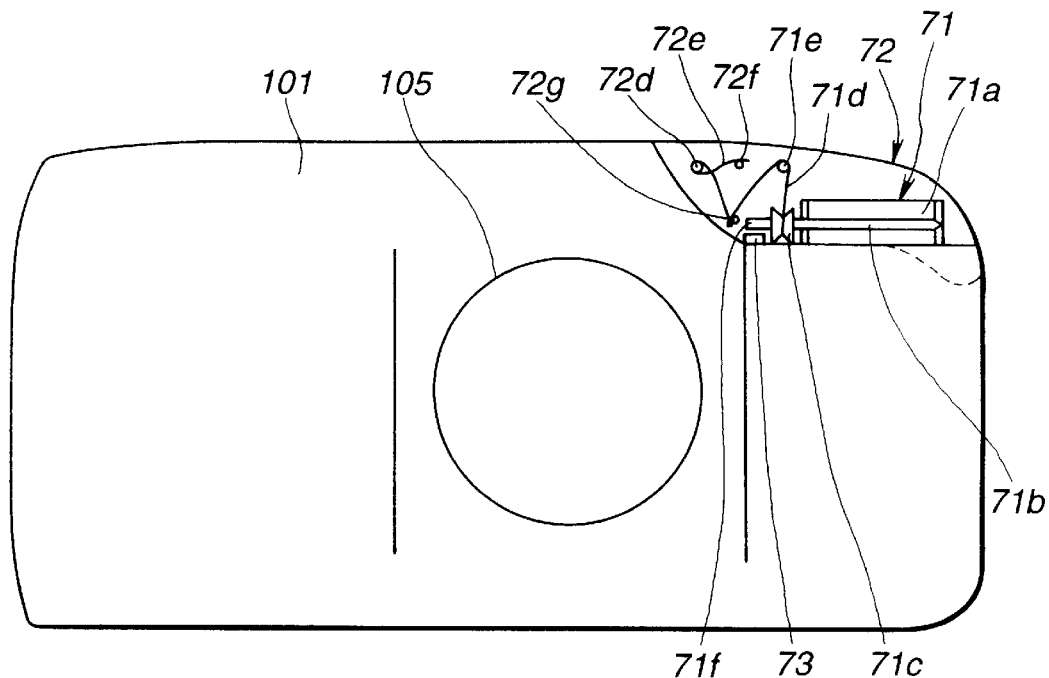
FIG. 23 is a front view showing the arrangement of in a storage state of a pop-up unit of the camera according to the fifth embodiment.
Figure 24:
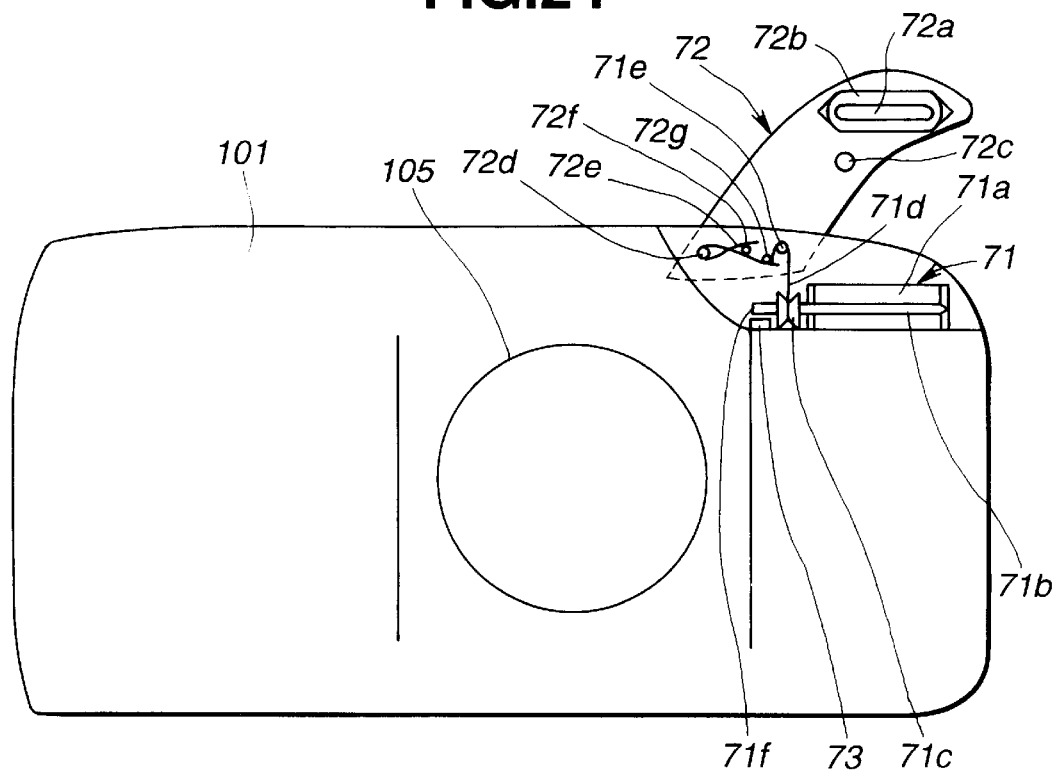
FIG. 24 is a front view showing the arrangement in an emissive state of the pop-up unit of the camera according to the fifth embodiment.
Figure 25:
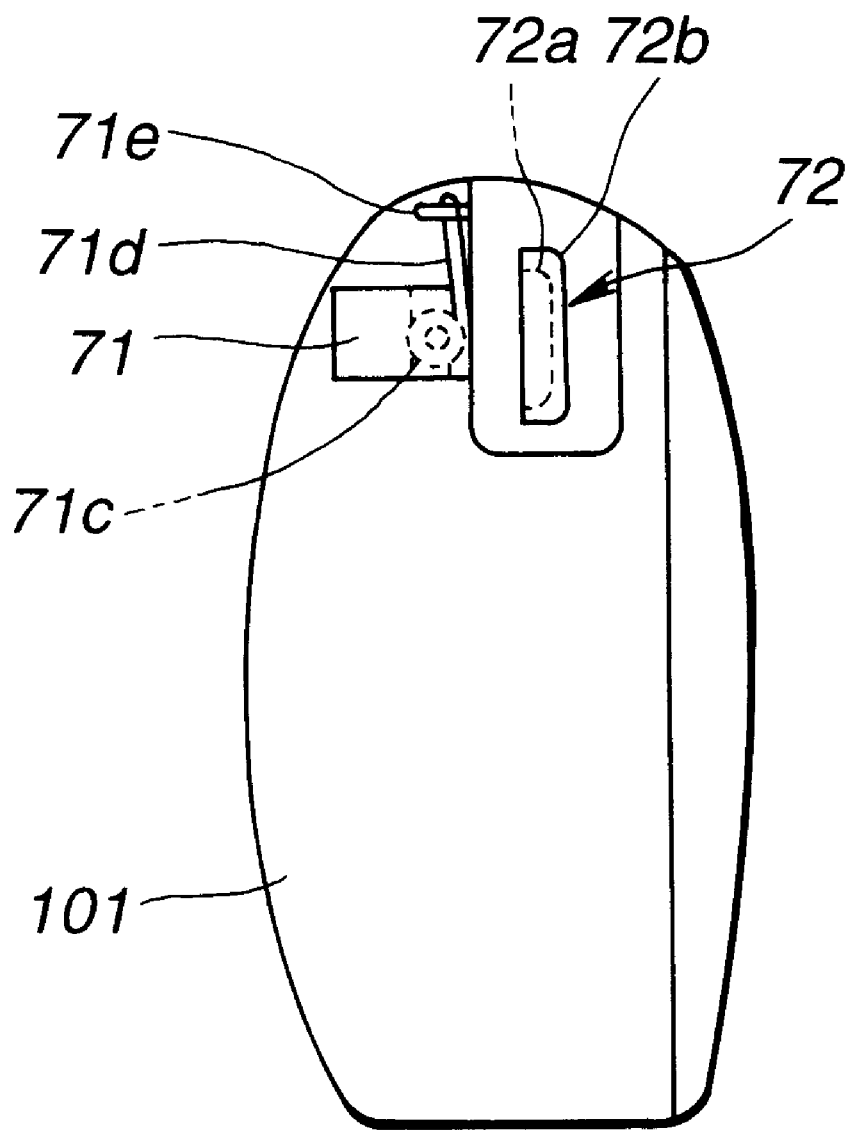
FIG. 25 is a right-side view showing the arrangement in a storage state of the pop-up unit of the camera according to the fifth embodiment.

FIG. 23 is a front view showing the arrangement of the pop-up unit of a camera in a storage state, FIG. 24 is a front view showing the arrangement of the pop-up unit of the camera in a light-emission capable state, and FIG. 25 is a right-side view showing the arrangement of the pop-up unit of the camera in the storage state.

This pop-up unit 72 is constituted by a xenon tube 72a which is applied with a voltage to emit light, an electronic flash umbrella 72b for irradiating light emitted from the xenon tube 72a in a predetermined direction, and a self LED 72c which flickers in self-timer photographing.

The pop-up unit 72 is arranged such that the pop-up unit 72 is rotated about a pin 72d with respect to the camera body. One end of the pop-up unit 72 is urged to a pin 72f extending from the camera body, and the other end is urged normally downward by the urging force of a spring 72e engaged with a pin 72g extending from the pop-up unit 72 in, i.e., a direction in which the pop-up unit 72 is in a storage state.

In addition, one end of a thread 71d is fixed to the pin 72g, and the thread 71d is hooked to a pin 71e extending from the camera body. Thereafter, the thread 71d is wound on a bobbin 71c fixed to a rotating member 71b of the pop-up motor 71.

The pop-up motor 71 causes the vibration member 71a to generate a tertiary stationary wave to rotate the rotating member 71b in a direction in which the thread 71d is released from the bobbin 71c. The pop-up motor 71 causes the vibration member 71a to generate a quintic stationary wave to rotate the rotating member 71b in a direction in which the thread 71d is wound on the bobbin 71c.

The pop-up unit 72 rotates the rotating member 71b to wind or release the thread 71d, so that the pop-up unit 72 is popped up in a light-emission capable state or popped down in storage state.

Any one of the ultrasonic motors described in the first to fourth embodiments may be used as the ultrasonic motor used as the pop-up motor 71.

A portion 71f, to be detected, on which white and black patterns are alternately coated in a peripheral direction is arranged at one end portion of the rotating member 71b, so that the rotating state of the portion 71f is detected by the pop-up PR 73.

Figure 26:
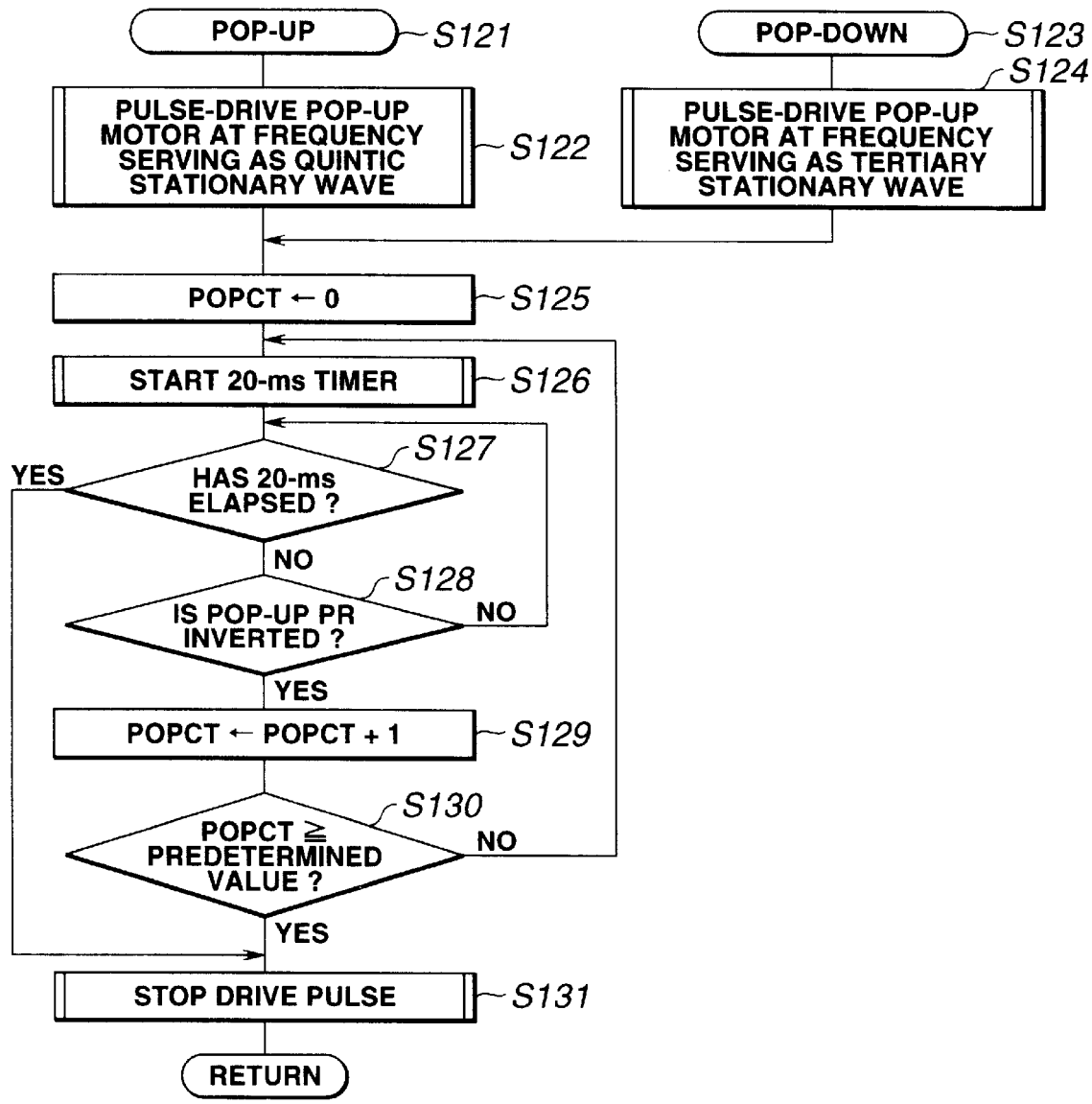
FIG. 26 is a flow chart an operation obtained when the pop-up unit is popped up or popped down in the camera according to the fifth embodiment.

FIG. 26 is a flow chart showing an operation of popping up or down the pop-up unit 72.

When the operation of popping up the pop-up unit 72 is started (step S121), the pop-up motor begins to be driven by a pulse voltage having a frequency at which a quintic stationary wave is generated by the vibration member 71a (step S122), and the thread 71d is wound on the bobbin 71c to start a pop-up operation of the pop-up unit 72.

A counter POPCT for counting pulses of the pop-up PR 73 is reset to zero (step S125), and a 20 ms timer is started (step S126). It is checked whether 20 ms has elapsed (step S127). If NO in step S127, it is checked whether an output from the pop-up PR 73 is inverted (step S128). If NO in step S128, the flow returns to step S127.

On the other hand, when the output from the pop-up PR 73 is inverted in step S128, the POPCT is counted incremented every inversion (step S129) to check whether the value of the counter POPCT has reached a predetermined value (step S130). If NO in step S130, the flow returns to step S126.

If the value of the counter POPCT has reached the predetermined value, or if 20 ms or more has elapsed before the output from the pop-up PR 73 inverts, a drive pulse supplied to the pop-up motor 71 is stopped (step S131).

More specifically, rotation is stopped when a time of 20 ms or more has elapsed before the output from the pop-up PR 73 is inverts, or pulses are sequentially generated by the pop-up PR 73 to make the value of the counter POPCT a predetermined value or more. For this reason, it can be detected that the pop-up unit 72 is reliably popped up.

On the other hand, when an operation of popping down the pop-up unit 72 is started (step S123), the pop-up motor begins to be driven by a pulse voltage having a frequency at which a tertiary stationary wave is generated by the vibration member 71a (step S124). Thereafter, the process in step S125 is performed, and the pop-up motor is driven until the pop-up unit 72 is set in a storage state.

Figure 27:
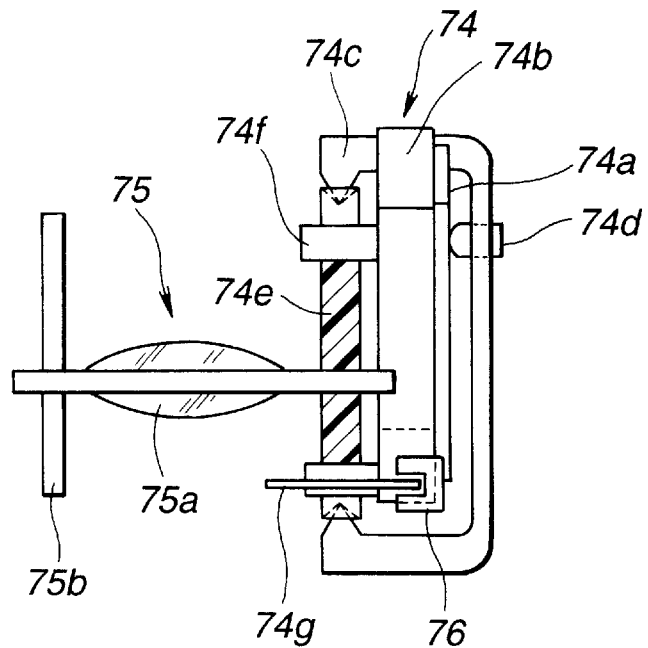
FIG. 27 is a side view showing the arrangement of a finder unit of the camera according to the present invention when viewed from one direction.
Figure 28:
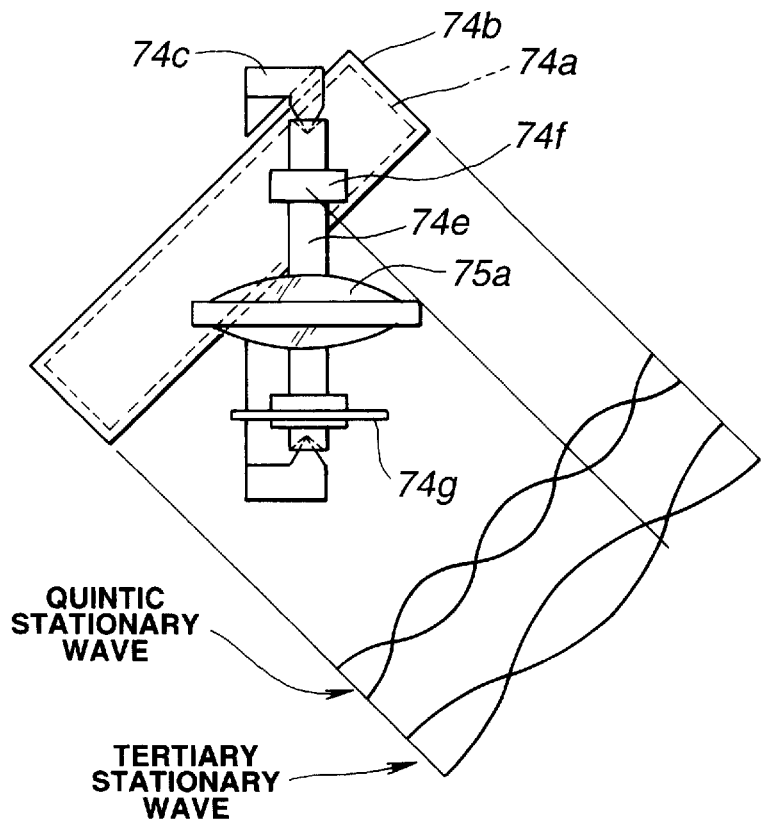
FIG. 28 is a side view showing the arrangement of the finder unit of the camera according to the present invention when viewed from another direction.

FIG. 27 is a side view showing the arrangement of the finder unit of a camera when viewed from one direction, and FIG. 28 is a side view showing the arrangement of the finder unit of the camera when viewed from the other direction.

This finder unit 75 has a finder lens 75a for performing a zoom operation of the finder and a suspended shaft 75b for slidably holding one end of the finder lens 75a in an optical axis direction. The other end of the finder lens 75a is meshed with a rotating member 74e serving as a member in which a screw for the finder motor 74 is formed.

This finder motor 74 is constituted such that a vibration member 74b to which a piezoelectric element 74a is adhered is brought into press contact with a large-diameter portion 74f of the rotating member 74e by using a fixing member 74c with which the screw 74d is meshed.

More specifically, the piezoelectric element 74a subjected to a polarizing process and having a plate-like shape is adhered to one surface of the vibration member 74b having an almost rectangular parallelopiped shape.

The vibration member 74b is held such that it is inclined at about 45° with respect to the fixing member 74c, as shown in FIG. 28, and is adhered by using an elastic adhesive. Although this arrangement makes vibration possible, the vibration member 74b and the fixing member 74c are arranged such that the relative positions of these members are not largely offset from each other.

The fixing member 74c holds conical recessed portions formed in both ends of the rotating member 74e by the sharp ends formed at both ends of the fixing member 74c to pivotally support the rotating member 74e.

The large-diameter portion 74f is pivotally integrated with the rotating member 74e, so that the large-diameter portion 74f is brought into contact with a surface of the vibration member 74b, opposing the surface to which the piezoelectric element 74a is adhered, with pressing force.

The pressing force used at this time is properly adjusted such that the end which penetrates through the fixing member 74c and is meshed therewith adjusts an amount of meshing of the screw 74d brought into contact with the piezoelectric element 74a.

In this manner, when no vibration is generated by the vibration member 74b, unexpected sliding of the rotating member 74e can be regulated by frictional force. When a vibration is generated by the vibration member 74b, the amount of meshing is adjusted such that the rotating member 74e can be rotated at a highest efficiency.

A disk-like member 74g in which slits are radially formed can be fixed to one end of the rotating member 74e, so that the rotating position of the disk-like member 74g is detected.

The operation of the finder motor 74 having the above arrangement will be described below.

A pulse voltage from the USM control circuit 60 (see FIG. 10) is applied to the piezoelectric element 74a to cause the piezoelectric element 74a to an extending/contracting operation, and a vibration is generated by the vibration member 74b. At this time, by properly selecting the frequency of the pulse voltage, the vibration generated by the finder motor 74 becomes a stationary wave.

The large-diameter portion 74f of the rotating member 74e is in contact with a position of the vibration member 74b where the extension of an amplitude obtained when a tertiary stationary wave is generated is different from the extension of an amplitude obtained when a quintic stationary wave is generated, as shown in FIG. 28.

When a pulse-drive operation is performed by a frequency at which a tertiary stationary wave is generated, the vibration member 74b presses the large-diameter portion 74f of the rotating member 74e to rotate the rotating member 74e in a clockwise direction when viewed from above.

Similarly, a pulse-drive operation is performed by a frequency at which a quintic stationary wave is generated, the vibration member 74b presses the large-diameter portion 74f of the rotating member 74e to counterclockwise rotate the rotating member 74e in a counterclockwise direction when viewed from the above.

Figure 29:
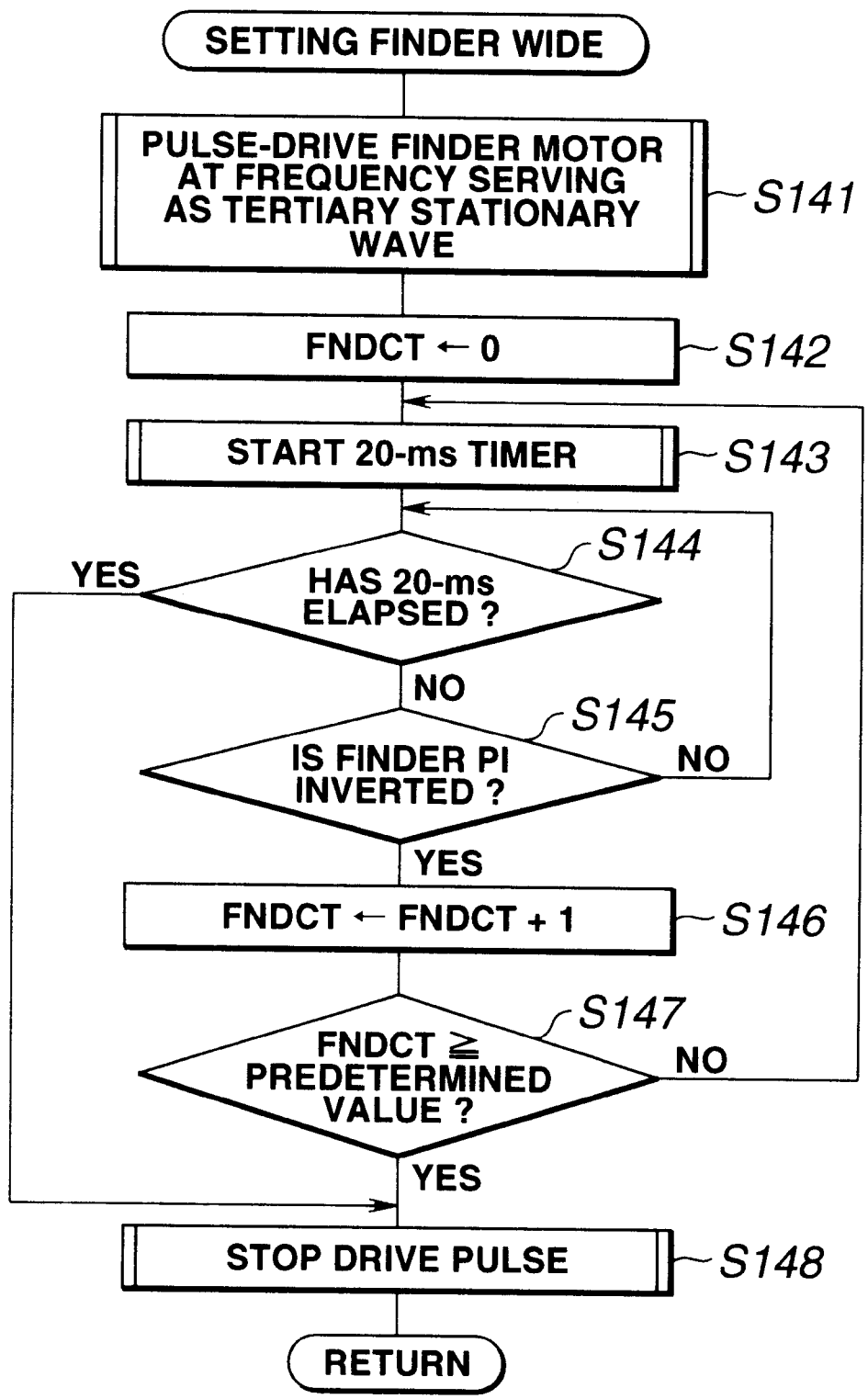
FIG. 29 is a flow chart showing an operation of moving the finder unit of the camera according to the fifth embodiment to a wide side.

FIG. 29 is a flow chart showing an operation of moving the finder unit described above to a wide side, and FIG. 30 is a flow chart showing an operation of zoom control of the finder unit.

As shown in FIG. 29, when the operation of moving the finder unit 75 to the wide side is started, the finder motor begins to be driven by a pulse voltage having a frequency at which a tertiary stationary wave is generated by the vibration member 74b (step S141).

A counter FNDCT for counting pulses of the finder PI 76 is reset to zero (step S142), and a 20 ms timer is started (step S143). It is checked whether 20 ms has elapsed (step S144). If NO in step S144, it is checked whether an output from the finder PI 76 is inverted (step S145). If NO in step S145, the flow returns to step S144.

On the other hand, when the output from the finder PI 76 is inverted in step S145, the counter FNDCT is incremented every inversion (step S146) to check whether the value of the counter FNDCT has reached a predetermined value (step S147). If NO in step S147, the flow returns to step S143.

If the value of the counter FNDCT has reached the predetermined value, or if time of 20 ms or more has elapsed before the output from the finder PI 76 inverts, a drive pulse supplied to the finder motor 74 is stopped (step S148).

Figure 30:
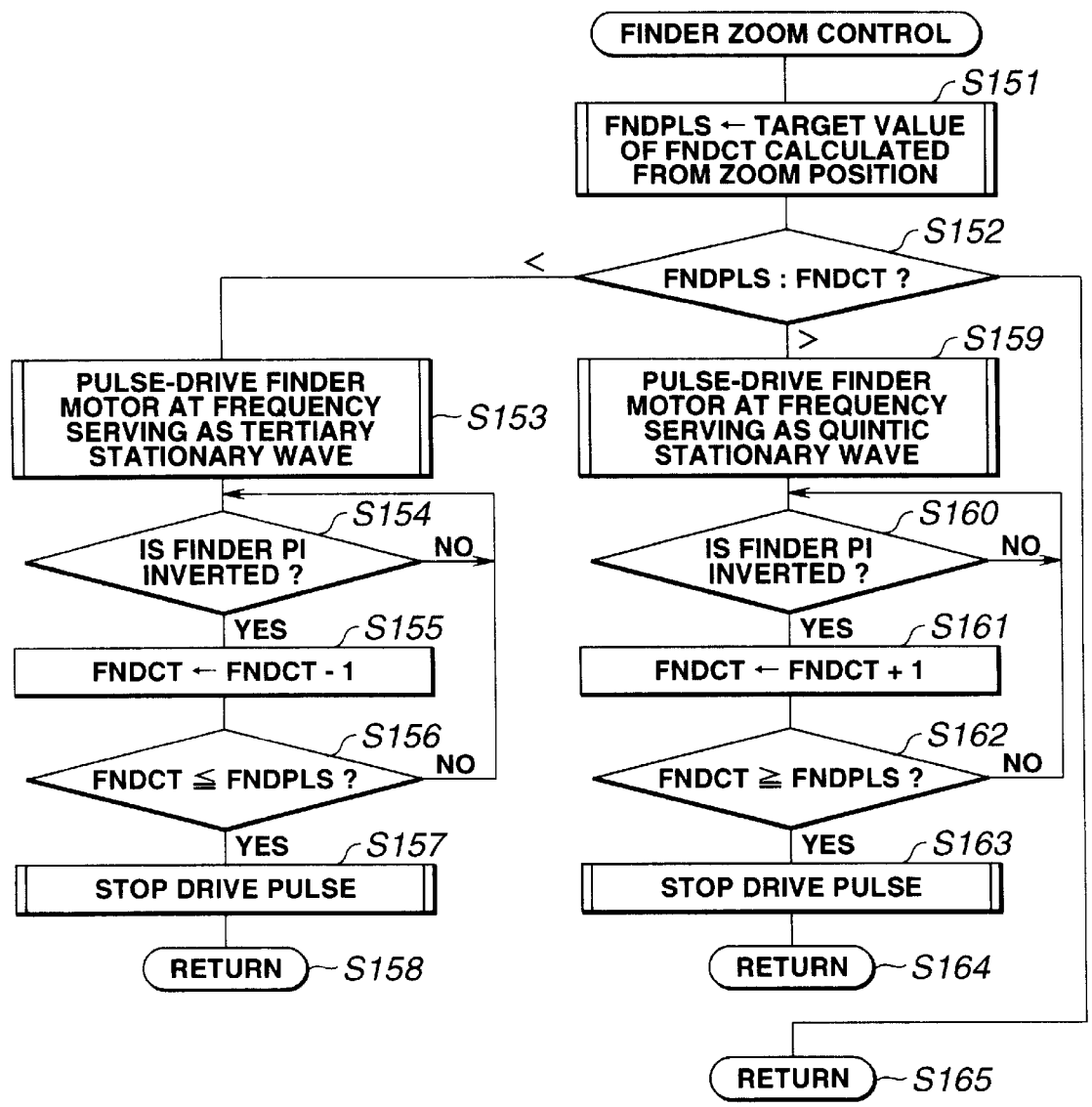
FIG. 30 is a flow chart showing a zoom control operation of the finder unit in the camera according to the fifth embodiment.

As shown in FIG. 30, when an operation of performing zoom control of the finder unit 75 is started, a target value of the counter FNDCT calculated from the zoom position of the photographing lens is set as an FNDPLS (step S151).

The present value of the counter FNDCT and the target value FNDPLS are compared with each other (step S152). If these values are equal to each other, the finder is located at a target zoom position. For this reason, the flow returns to the main routine (step S165).

If the present value of the counter FNDCT is larger than the target value FNDPLS, the finder motor begins to be driven by a pulse voltage having a frequency at which a tertiary stationary wave is generated (step S153), and the CPU waits until an output from the finder PI 76 is inverted (step S154). When the output is inverted, the counter FNDCT is decremented (step S155). It is checked whether the value of the counter FNDCT reaches the target value FNDPLS (step S156). If NO in step S156, the flow returns to step S154.

When the value of the counter FNDCT reaches the target value FNDPLS, a drive pulse supplied to the finder motor 74 is stopped (step S157), and the flow returns to the main routine (step S158).

On the other hand, if the present value of the counter FNDCT is smaller than the target value FNDPLS, the finder motor begins to be driven by a pulse voltage having a frequency at which a quintic stationary wave is generated (step S159), and the CPU waits until an output from the finder PI 76 is inverted (step S160). When the output is inverted, the counter FNDCT is incremented (step S161). It is checked whether the value of the counter FNDCT reaches the target value FNDPLS (step S162). If NO in step S162, the flow returns to step S160.

When the value of the counter FNDCT reaches the target value FNDPLS, a drive pulse supplied to the finder motor 74 is stopped (step S163), and the flow returns to the main routine (step S164).

Figure 31:
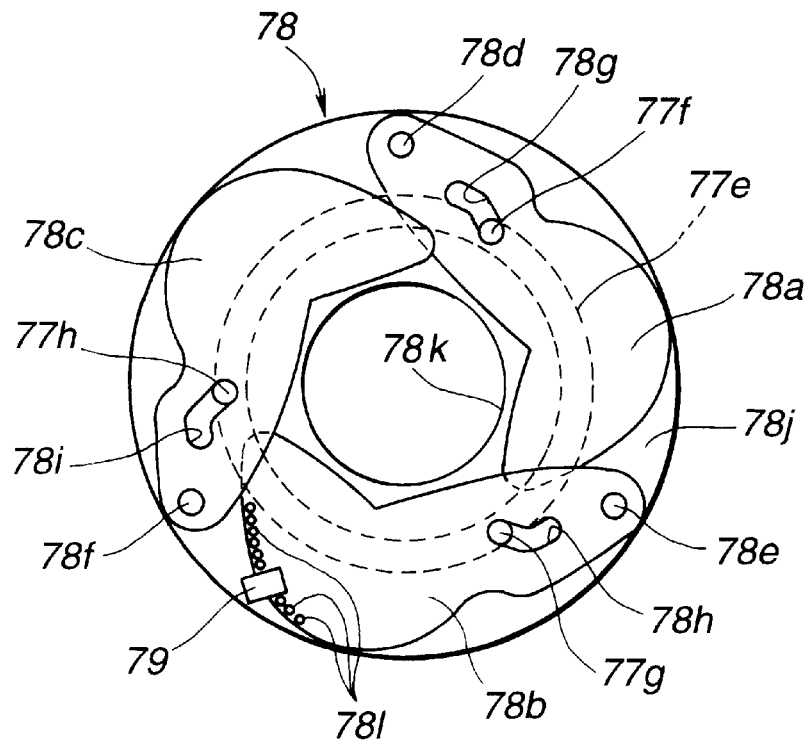
FIG. 31 is a front view showing the arrangement of a shutter unit of the camera according to the fifth embodiment.
Figures 32A, 32B:
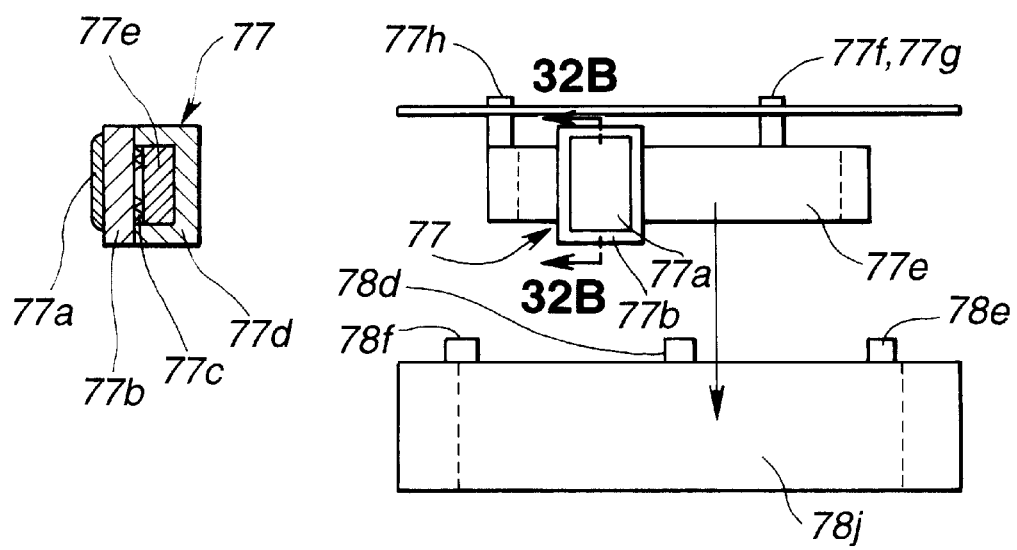
FIG. 32A is an exploded side view showing the arrangement of the shutter unit of the camera according to the fifth embodiment.
FIG. 32B is a sectional view showing the arrangement of the shutter unit of the camera according to the fifth embodiment.

FIG. 31 is a front view showing the arrangement of the shutter unit of a camera, and FIGS. 32A and 32B are an exploded side view and an exploded sectional view which show the arrangement of the shutter unit of the camera.

This shutter unit 78 is constituted by a holding member 78*j* having an circular opening 78*k* and three sectors 78*a*, 78*b*, and 78*c* pivotally supported by support pins 78*d*, 78*e*, and 78*f* projecting from the holding member 78*j*.

Holes 78*g*, 78*h*, and 78*i* each having an almost V shape are formed in the three sectors 78*a*, 78*b*, and 78*c*, respectively. Projections 77*f*, 77*g*, and 77*h* of a movable member 77*e* are engaged with the holes 78*g*, 78*h*, and 78*i*, respectively.

In this manner, when the movable member 77*e* is pivoted, the three sectors 78*a*, 78*b*, and 78*c* are interlocked with each other and are opened/closed.

A plurality of holes 78*l* are formed in one sector 78*b* of the three sectors along one portion of the peripheral portion of the sector 78*b*, so that the position of the sector 78*b*, i.e., an amount of opening constituted by the sectors 78*a*, 78*b*, and 78*c*, can be detected by the shutter PI 79.

The movable member 77*e* is formed as a part of the shutter motor 77 constituted by an ultrasonic motor.

More specifically, the shutter motor 77 is constituted such that, as shown in FIG. 32B, the movable member 77*e* is interposed between the vibration member 77*b* to which the shutter motor 77 is adhered, and a fixing member 77*d* having an almost U-shaped section to bring four projections 77*c* projecting from the vibration member 77*b* into press contact with the movable member 77*e*. These four projections 77*c* have the same shapes as those in the fourth embodiment described above.

A pulse voltage is applied to a piezoelectric element 77*a* to cause the vibration member 77*b* to generate a tertiary stationary wave or a quintic stationary wave, thereby pivoting the movable member 77*e* around the optical axis of the photographing lens. In this manner, the opening/closing operation of the sectors 78*a*, 78*b*, and 78*c* is performed.

As described above, the movable member 77*e* is held between the vibration member 77*b* and the fixing member 77*d* and is fixed with pressure. For this reason, when only a drive pulse is stopped, aperture control can be easily performed.

Figure 34:
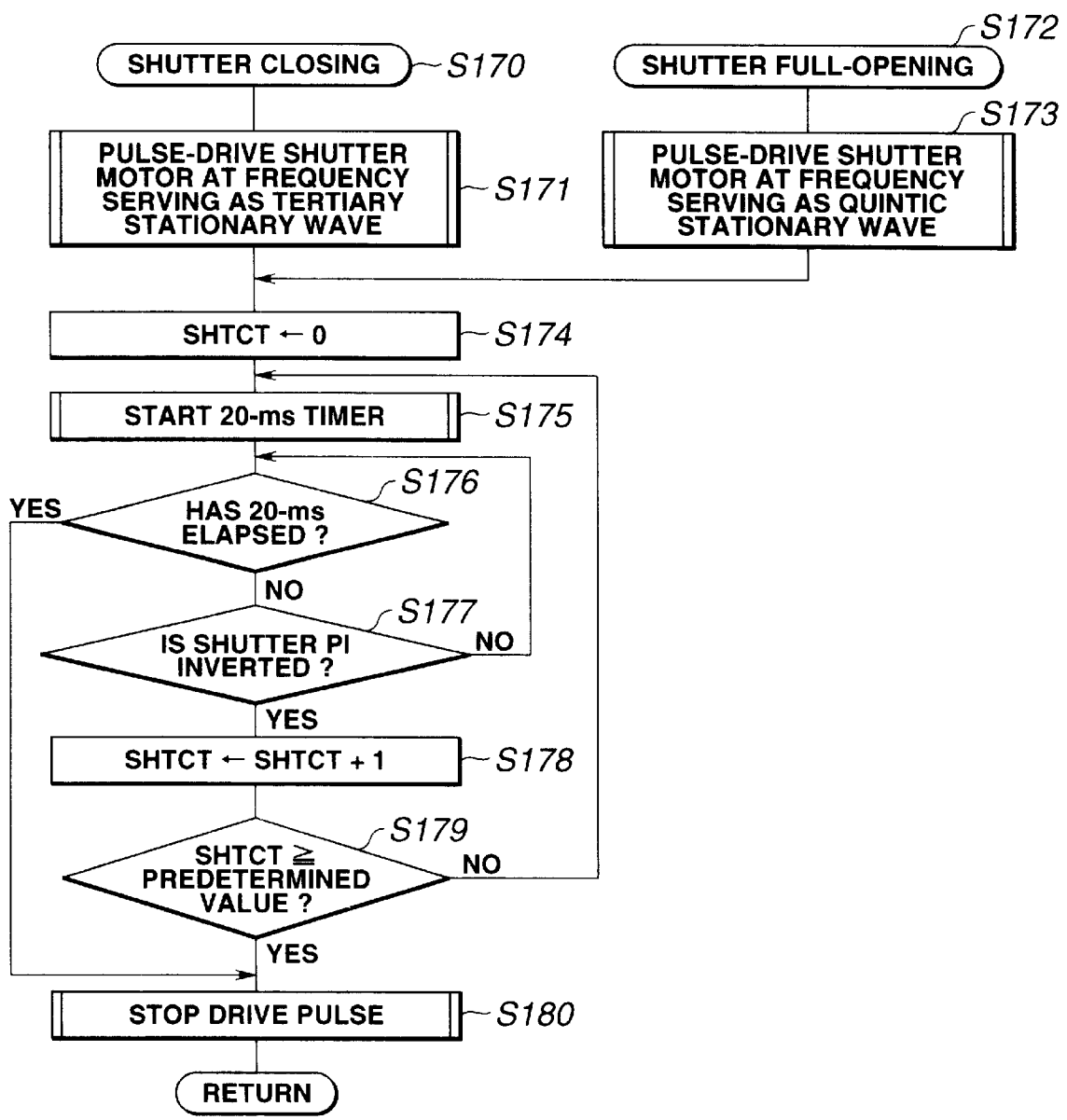
FIG. 34 is a flow chart showing an operation of closing the shutter unit of the camera according to the fifth embodiment and an operation of fully opening the shutter unit.
Figure 35:
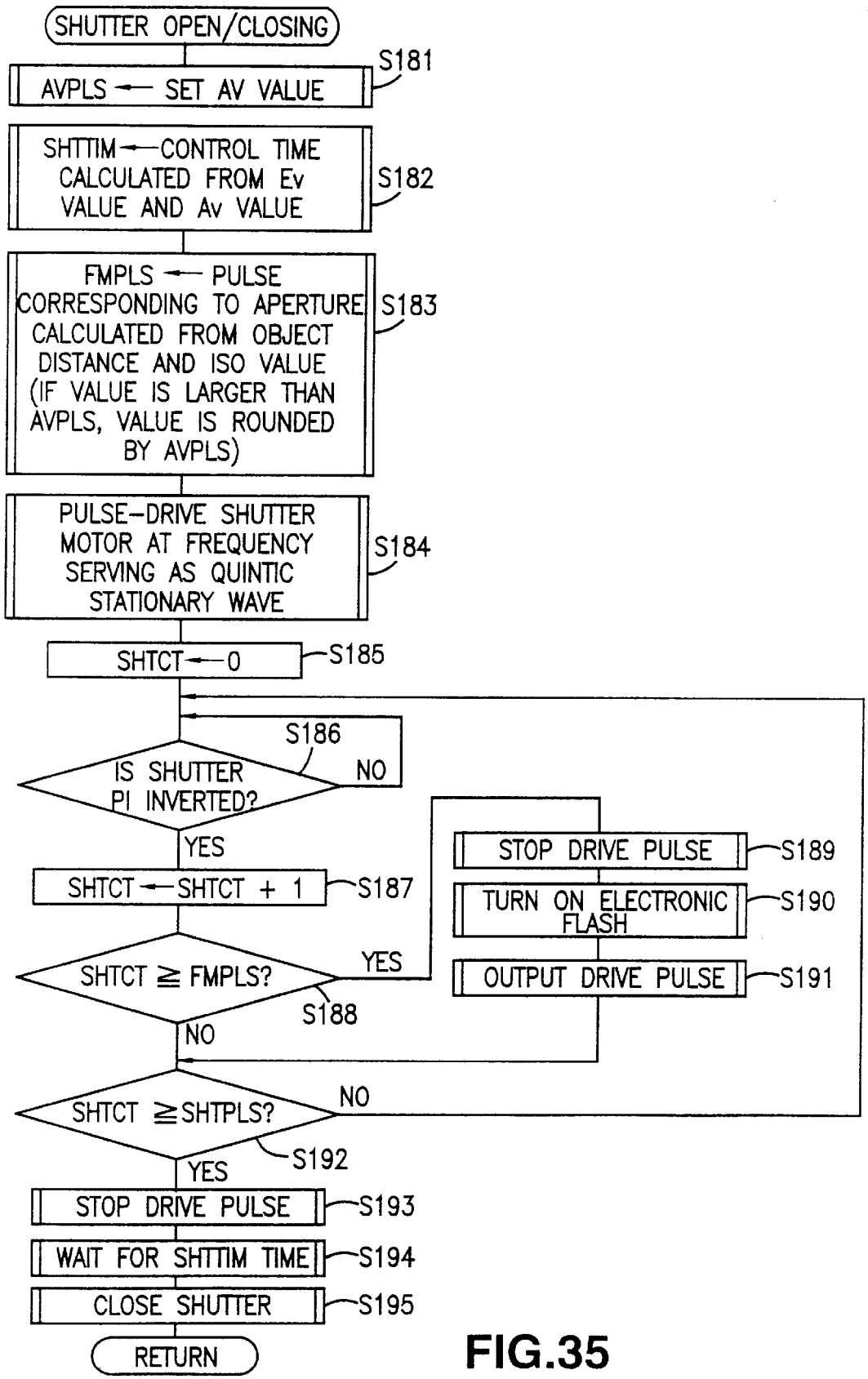
FIG. 35 is a flow chart showing an opening/closing operation of the shutter unit of the camera according to the fifth embodiment.

FIGS. 33A, 33B, 33C, and 33D are graphs showing aperture waveforms of the shutter unit of the camera, FIG. 34 is a flow chart showing an operation of closing the shutter unit of the camera and an operation of fully opening the shutter unit, and FIG. 35 is a flow chart showing an opening/closing operation of the shutter unit of the camera.

As shown in FIG. 34, when the operation of closing the shutter unit 78 is started (step S170), the shutter motor begins to be driven by a pulse voltage having a frequency at which a tertiary stationary wave is generated by the vibration member 77*b* (step S171).

A counter SHTCT for counting pulses of the shutter PI 79 is reset to zero (step S174), and a 20-ms timer is started (step S175). It is checked whether 20 ms has elapsed (step S176). If NO in step S176, it is checked whether an output from the shutter PI 79 is inverted (step S177). If NO in step S177, the flow returns to step S176.

On the other hand, when the output from the shutter PI 79 is inverted in step S177, the counter SHTCT is counted up every inversion (step S178) to check whether the value of the counter SHTCT reaches a predetermined value (step S179). If NO in step S179, the flow returns to step S175.

If the value of the counter SHTCT reaches the predetermined value, or if time of 20 ms or more has elapsed before the output from the shutter PI 79 is inverts, a drive pulse supplied to the shutter motor 77 is stopped (step S180).

On the other hand, when the operation of fully opening the shutter unit 78 is started (step S172), the shutter motor begins to be driven by a pulse voltage having a frequency at which a quintic stationary wave is generated by the vibration member 77*b* (step S173). Thereafter, the flow shifts to step S174 to drive the shutter motor until the sectors 78*a*, 78*b*, and 78*c* are fully open.

As shown in FIG. 35, when an operation of opening/closing the shutter unit 78 to perform exposure is started, the number of pulses of the shutter PI 79 corresponding to an AV value set by an aperture setting means is set as an AVPLS (step S181).

On the basis of an Ev value and an Av value calculated from information such as a photometric value output from the photometric circuit 52 and a film sensitivity (ISO value), control time is calculated. The resultant value is set as an SHTTIM (step S182).

The number of pulses of the shutter PI 79 corresponding to the aperture calculated from an object distance output from the distance-measurement circuit 51 and the ISO value is set as an FMPLS (step S183). At this time, when the calculated value is larger than the AVPLS, the value is limited to the AVPLS.

Thereafter, the shutter motor begins to be driven by a pulse voltage having a frequency at which a quintic stationary wave is generated, and the sectors 78a, 78b, and 78c begin to open (step S184).

The counter SHTCT for counting pulses of the shutter PI 79 is reset to zero (step S185), and the CPU waits until the output from the shutter PI 79 is inverted (step S186). The counter SHTCT is incremented each time the output from the shutter PI 79 is inverted (step S187).

Subsequently, it is checked whether the count value SHTCT has reached the FMPLS (step S188). If YES in step S188, a drive pulse supplied to the shutter motor 77 is stopped (step S189), and the electronic flash in the pop-up unit 72 emits light (step S190). At this time, when light emission of the electronic flash is not necessary, the electronic flash does not emit light.

Upon completion of light emission of the electronic flash, a drive pulse supplied to the shutter motor 77 is output again to open the sectors 78a, 78b, and 78c (step S191).

If the process in step S191 is completed, or if the count value SHTCT does not reach the FMPLS in step S188, it is checked whether the count value SHTCT reaches an SHTPLS (step S192). If NO in step S192, the flow returns to step S186.

On the other hand, if the counter value SHTCT reaches the SHTPLS, a drive pulse supplied to the shutter motor 77 (step S193), and the CPU waits for a time corresponding to the SHTTIM (step S194). The process for closing the sectors 78a, 78b, and 78c is performed to complete exposure (step S195), and the flow returns to the main routine.

An aperture waveform obtained when the opening/closing operation of the sectors 78a, 78b, and 78c is as shown in FIG. 33B.

More specifically, the sectors 78a, 78b, and 78c are opened by a drive pulse (see FIG. 33D) having a frequency corresponding to a quintic stationary wave, and the drive pulse is stopped at a point where the number of pulses (see FIG. 33C) of the shutter PI 79 reaches the FMPLS to stop the shutter motor 77 and to perform light emission of the electronic flash (see FIG. 33A). Thereafter, the drive pulse is restarted. When the number of pulses of the shutter PI 79 reaches the SHTPLS, the drive pulse is stopped to stop the shutter motor 77.

After control time corresponding to the SHTTIM has elapsed, the sectors 78a, 78b, and 78c are closed by a drive pulse having a frequency corresponding to a tertiary stationary wave.

Since the ultrasonic motor has a short time constant, the opening/closing operation of the sectors 78a, 78b, and 78c is also easily stopped halfway. Therefore, the above operation is performed, the aperture controlled by the sectors 78a, 78b, and 78c is not prevented from being changed while the electronic flash emits light.

FIG. 36 is a front view showing the arrangement of the finder mask unit of a camera.

The finder mask unit 81 is constituted by a pair of upper and lower finder mask members 81a and 81b each having an almost L shape, and vertical long holes 81c and 81d are formed in the finder mask members 81a and 81b, respectively. Pins 81e and 81f extending from the camera body are engaged with the long holes 81c and 81d, respectively, so that the finder mask unit 81 can be vertically moved.

A regulation member 81k is arranged between the pair of finder mask members 81a and 81b to allow vertical movement of the finder mask unit 81, and to regulate the finder mask unit 81 in the other directions.

A portion to be detected constituted by a perfect light-shielding portion 81i and a semi-transparent portion 81j is formed at one end of the upper finder mask member 81a. The portion to be detected is caused to pass through the finder mask PI 82, so that this position of the portion can be detected. In this case, when light from the finder mask PI 82 is perfectly transmitted through the portion to be detected, a normal state is set. When the perfect light-shielding portion 81i is detected, a panorama state is set. When the semi-transparent portion 81j is detected, an intermediate state is set.

The finder mask motor 80 is brought into press contact with the side surfaces of extending portions 81g and 81h of the finder mask members 81a and 81b.

The finder mask motor 80 is an ultrasonic motor constituted in the same manner as that of the fourth embodiment described above. The finder mask motor 80 has a pair of projections constituting a V shape, and a pair of projections constituting a vertically inverted V shape.

When vibration is generated by a tertiary stationary wave, control is performed such that the interval between the finder mask members 81a and 81b is increased. When vibration is generated by a quintic stationary wave, control is performed such that the interval between the finder mask members 81a and 81b is decreased.

FIGS. 37A and 37B are waveform charts showing control signals used when the finder mask unit of the camera is set in a panorama state, FIGS. 37C and 37D are waveform charts showing control signals used when the finder mask unit of the camera is set in a normal state.

When the finder mask unit 81 is set in a panorama state, the finder mask motor 80 is driven by a pulse voltage (see FIG. 37A) having a frequency at which a tertiary stationary wave is generated. When the finder mask PI 82 (see FIG. 37B) is shielded from light, a pulse voltage supplied to the finder mask motor 80 is stopped.

When the finder mask unit 81 is set in a normal state, the finder mask motor 80 is driven by a pulse voltage (see FIG. 37C) having a frequency at which a quintic stationary wave is generated. When the finder mask PI 82 (see FIG. 37D) is shielded from light, a pulse voltage supplied to the finder mask motor 80 is stopped.

On the other hand, the feeding unit 84 or the zoom unit 87 are controlled by the feeding motor 83 and the zoom motor 86 which are constituted by DC motors. The arrangement of these motors is a normal arrangement, therefore, special description thereof is not required. For this reason, the description of the arrangement is omitted.

According to the fifth embodiment, when a piezoelectric actuator which has a simple arrangement and can be driven in a plurality of directions by using one piezoelectric element is applied to various drive units constituting the camera, a small-size light-weight camera can be provided.

FIGS. 38A, 38B, and 38C show the sixth embodiment of the present invention, and are a front view, a right-side view, and a bottom view respectively, showing the arrangement of an actuator.

This embodiment is obtained by changing an arrangement for holding a vibration member and a rotating member for the actuator shown in FIGS. 3A, 3B, and 3C.

This actuator is constituted such that a vibration member 92 serving as a vibrator to which a laminate type piezoelectric element 91 serving as an electromechanical energy conversion element is adhered is brought into press contact with a rotating member 93 serving as a member to be driven by using a fixing member 94.

More specifically, a vibration member 92 extends from one surface of the vibration member 92 having an almost rectangular parallelopiped shape, and the piezoelectric element 91 is adhered to a surface 92h of the positioning projection 92g by using an adhesive. In addition, a fixing member 95 is arranged to be sandwiched from the other end side of the piezoelectric element 91. An adhesive is coated on two surfaces 95a and 95b of the fixing member 95, and pressure acts on the two surfaces 95a and 95b. In this manner, the fixing member 95 is fixed to the vibration member 92, and the piezoelectric element 91 is fixed with pressure.

Since an adhesive need not be specially coated on a surface 92i of the vibration member 92 opposing the piezoelectric element 91, the piezoelectric element 91 is not adhered to the surface 92i.

As shown in FIG. 38A, four projections 92a, 92b, 92c, and 92d which are vertically aligned from the upper side to the lower side extend from the surface of the vibration member 92 opposing the surface to which the piezoelectric element 91 is adhered. Of these projections, the projections 92a and 92d are arranged on this side, and the projections 92b and 92c are arranged on the other side.

Four projections 96a, 96b, 96c, and 96d extend from the front and rear surfaces of the vibration member 92 in FIG. 38A. The projections 96a, 96b, 96c, and 96d are arranged at positions which do not correspond to neither one of a node and a loop in either one of a tertiary stationary wave and a quintic stationary wave.

More specifically, the projections 96a, 96b, 96c, and 96d are arranged to be positioned between the projection 92a and the projection 92b and between the projection 92c and 92d as shown in FIG. 38A. However, the present invention is not limited to this arrangement, and the projections 96a, 96b, 96c, and 96d can also be arranged at positions indicated by reference numerals 92e and 92f, for example.

The projections 96a, 96b, 96c, and 96d are arranged such that the distal ends thereof are inclined as shown in FIG. 38C. The projections 96a, 96b, 96c, and 96d are easily fitted in the fixing member 94, and are easily removed from the fixing member 94 after the projections are fitted in the fixing member.

The vibration member 92 described above is held by calking and adhesive fixing such that the projections 96a, 96b, 96c, and 96d penetrated through the holes formed in the fixing member 94 having an almost rectangular frame shape. The other portion is arranged not to be in contact with the fixing member 94 in a stable state nor vibration state. With this arrangement, the upper and lower end portions, serving as loops of vibration, of the vibration member 92 are not in contact with the fixing member 94, unlike the actuator shown in FIGS. 3A, 3B, and 3C, so that energy loss is reduced.

The fixing member 94 is constituted by an upper surface portion 94a, a bottom surface portion 94b, and both side portions 94c and 94d to have the rectangular frame shape. Notches 94e are formed in the upper surface portion 94a and the bottom surface portion 94b.

Support shafts 93a and 93b arranged at both the ends of the rotating member 93 are fitted in the pair of notches 94e. In this manner, the rotating member 93 is pivotally held.

For example, a helical gear 93c is pivotally integrated with the central portion of the rotating member 93, so that generated drive force is transmitted to the other members. The projections 92a, 92b, 92c, and 92d are brought into contact with the peripheral surface of the rotating member 93 with pressing force.

The above actuator is assembled in the following manner.

The support shafts 93a and 93b of the rotating member 93 are inserted into the notches 94e of the fixing member 94. Thereafter, the vibration member 92 is press-fitted while the inclined portions formed at the distal ends of the projections 92a, 92b, 92c, and 92d are used. After the projections 92a, 92b, 92c, and 92d are fitted in the holes of the fixing member 94, the projections 92a, 92b, 92c, and 92d cannot be removed from the holes by the inclined portions. As described above, the projections 92a, 92b, 92c, and 92d are fixed to the holes by calking or adhering.

The operation of the actuator according to the sixth embodiment described above will be described below.

When a pulse voltage from the pulse control circuit 1 (see FIGS. 1 and 2) is applied to the piezoelectric element 91, the piezoelectric element 91 performs an extending/contracting operation to cause the vibration member 92 to generate vibration. At this time, when the frequency of the pulse voltage is properly selected, the vibration generated by the vibration member 92 becomes a stationary wave.

As shown in FIG. 38A, the projections 92a and 92d are arranged at positions which are nodes when the stationary wave generated by the vibration member 92 is a tertiary stationary wave, and which are loops when the stationary wave is a quintic stationary wave. The projections 92b and 92c are arranged at positions which are loops (portions except for nodes) when the stationary wave generated by the vibration member 92 is a tertiary stationary wave and which are nodes when the stationary wave is a quintic stationary wave.

When a pulse drive operation is performed by a frequency at which a tertiary stationary wave is generated, the projections 92b and 92c press the rotating member 93, but the projections 92a and 92d do not generate pressing force because the projections 92a and 92d are positioned at nodes. In this manner, when the actuator is viewed from the bottom surface side as shown in FIG. 38C, the rotating member 93 is clockwise rotated in a clockwise direction.

Similarly, when a pulse drive operation is performed at a frequency at which a quintic stationary wave is generated, the projections 92a and 92d press the rotating member 93, but the projections 92a and 92d do not generate pressing force because the projections 92a and 92d are positioned at nodes. In this manner, when the actuator is viewed from the bottom surface side as shown in FIG. 38C, the rotating member 93 is rotated in a counterclockwise direction.

The respective shapes of the respective members can be easily applied depending on the ease of manufacturing the shapes.

According to the sixth embodiment, an effect which is almost the same as that of each of the above embodiments can be obtained. Furthermore, the upper and lower end portions of the vibration member are completely separated from the fixing member, and are not brought into contact with the fixing member even in a vibration state. For this reason, energy loss caused by contact is advantageously small.

In this invention, it is apparent that working modes different in a wide range can be formed on this basis of this invention without departing from the spirit and scope of the invention. This invention is not restricted by any specific embodiment except being limited by the appended claims.

What is claimed is:

1. An actuator comprising:
an electromechanical energy conversion element;
a vibrator, having at least two resonance frequencies, to which said electromechanical energy conversion element is fixed and in which a drive voltage is applied to said electromechanical energy conversion element to selectively excite a first vibration generated by vibration at one resonance frequency and a second vibration generated by vibration at the other resonance frequency;
a member to be driven which is in press contact with said vibrator and is moved by the vibration excited by said vibrator with respect to said vibrator; and
a fixing member for holding said vibrator and said member to be driven, and for regulating a moving direction of said member to be driven with respect to said vibrator,
wherein said vibrator generates a drive force in a first direction at a press contact portion between said vibrator and said member to be driven when vibrating at one resonance frequency, and generates a drive force in a second direction at a contact portion between said vibrator and said member to be driven when vibrating at the other resonance frequency.

2. An actuator comprising:
an electromechanical energy conversion element;
a vibrator to which said electromechanical energy conversion element is fixed and in which a drive voltage is applied to said electromechanical energy conversion element to selectively excite a first vibration generated in a first vibration mode and a second vibration generated in a second vibration mode;
a first projection arranged on said vibrator at a position which serves as a node of said vibrator when the first vibration is excited and does not serve as the node of said vibrator when the second vibration is excited;
a second projection arranged on the vibrator at a position which serves as a node of said vibrator when the second vibration is excited and does not serve as the node of said vibrator when the first vibration is excited;
a portion to be driven which is brought into press contact with said first and second projections and moved by vibration excited by said vibrator with respect to said vibrator; and
a fixing member for holding said vibrator and said member to be driven and for regulating a moving direction of said member to be driven with respect to said vibrator.

3. An actuator according to claim 1, wherein said member to be driven is moved in the first direction by the drive force in the first direction with respect to said vibrator and moved in the second direction by the drive force in the second direction.

4. An actuator according to claim 2, wherein said member to be driven is moved in the first direction with respect to said vibrator when the first vibration is excited and moved in the second direction with respect to said vibrator when the second vibration is excited.

5. An actuator according to claim 3, wherein the first and second directions are amplitude directions of said vibrator and opposite to each other.

6. An actuator according to claim 3, wherein the first and second directions are inclined with respect to an amplitude direction of said vibrator and opposite to each other.

7. An actuator according to claim 4, wherein the first and second directions are amplitude directions of said vibrator and opposite to each other.

8. An actuator according to claim 4, wherein the first and second directions are inclined with respect to an amplitude direction of said vibrator and opposite to each other.

9. An actuator comprising:
an electro-mechanical energy conversion element;
a vibrator to which said electromechanical energy conversion element is fixed and in which a drive voltage is applied to said electromechanical energy conversion element to excite vibration;
a member to be driven which is brought into press contact with said vibrator and moved by vibration excited by said vibrator with respect to said vibrator; and
a fixing member for holding said vibrator and said member to be driven and regulating a moving direction of said member to be driven with respect to said vibrator.

10. An actuator according to claim 1, wherein said fixing member is constituted by a single member.

11. An actuator according to claim 2, wherein said fixing member is constituted by a single member.

12. An actuator according to claim 9, wherein said fixing member is constituted by a single member.

13. An actuator according to claim 1, wherein said electro-mechanical energy conversion element is constituted by a single piezoelectric element.

14. An actuator according to claim 1, wherein said electro-mechanical energy conversion element is constituted by a laminate type piezoelectric element.

15. An actuator according to claim 2, wherein said electro-mechanical energy conversion element is constituted by a single piezoelectric element.

16. An actuator according to claim 2, wherein said electro-mechanical energy conversion element is constituted by a laminate type piezoelectric element.

17. An actuator according to claim 9, wherein said electro-mechanical energy conversion element is constituted by a single piezoelectric element.

18. An actuator according to claim 9, wherein said electro-mechanical energy conversion element is constituted by a laminate type piezoelectric element.

19. An actuator according to claim 1, wherein said member to be driven drives a constituent member of a camera.

20. An actuator according to claim 2, wherein said member to be driven drives a constituent member of a camera.

21. An actuator according to claim 9, wherein said member to be driven drives a constituent member of a camera.

22. An actuator according to claim 19, wherein the constituent member of said camera is a film mask member.

23. An actuator according to claim 19, wherein the constituent member of said camera is a mirror member of a distance-measurement optical system.

24. An actuator according to claim 19, wherein the constituent member of said camera comprised a photographing optical system unit.

25. An actuator according to claim 24, wherein the constituent member is a lens frame.

26. An actuator according to claim 19, wherein the constituent member of said camera comprises a pop-up unit of an electronic flash.

27. An actuator according to claim 19, wherein the constituent member of said camera comprises a shutter unit.

28. An actuator according to claim 20, wherein the constituent member of said camera is a film mask member.

29. An actuator according to claim 20, wherein the constituent member of said camera is a mirror member of a distance-measurement optical system.

30. An actuator according to claim 20, wherein the constituent member of said camera comprises a photographing optical system unit.

31. An actuator according to claim 30, wherein the constituent member is a lens frame.

32. An actuator according to claim 20, wherein the constituent member of said camera comprises a pop-up unit of an electronic flash.

33. An actuator according to claim 20, wherein the constituent member of said camera comprises a shutter unit.

34. An actuator according to claim 21, wherein the constituent member of said camera is a film mask member.

35. An actuator according to claim 21, wherein the constituent member of said camera is a mirror member of a distance-measurement optical system.

36. An actuator according to claim 21, wherein the constituent member of said camera comprises a photographing optical system unit.

37. An actuator according to claim 36, wherein the constituent member is a lens frame.

38. An actuator according to claim 21, wherein the constituent member of said camera comprises a pop-up unit of an electronic flash.

39. An actuator according to claim 21, wherein the constituent member of said camera comprises a shutter unit.

* * * * *